US006876462B2

(12) United States Patent
Okada et al.

(10) Patent No.: US 6,876,462 B2
(45) Date of Patent: Apr. 5, 2005

(54) NETWORK PRINTER

(75) Inventors: Kumi Okada, Kanagawa (JP); Kiyoshi Toyoda, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 665 days.

(21) Appl. No.: 09/978,033

(22) Filed: Oct. 17, 2001

(65) Prior Publication Data

US 2002/0018237 A1 Feb. 14, 2002

Related U.S. Application Data

(62) Division of application No. 09/476,326, filed on Jan. 3, 2000, now Pat. No. 6,396,592, which is a division of application No. 08/930,614, filed as application No. PCT/JP97/00866 on Mar. 18, 1997, now Pat. No. 6,088,125.

(30) Foreign Application Priority Data

Apr. 4, 1996 (JP) .............................................. 8-082296

(51) Int. Cl.[7] .............................................. G06K 15/00
(52) U.S. Cl. ........................ 358/1.15; 358/1.6; 358/405; 358/440
(58) Field of Search ................................. 358/400, 401, 358/402, 403, 405, 407, 434, 436, 438, 439, 440, 442, 443, 448; 379/90.02, 93.24, 100.08, 100.13, 100.15, 100.01

(56) References Cited

U.S. PATENT DOCUMENTS

| 4,941,170 A | 7/1990 | Henderson | .................. 379/100 |
| 5,057,935 A | 10/1991 | Williams | .................... 358/402 |
| 5,291,302 A | 3/1994 | Gordon et al. | ............. 358/400 |
| 5,521,719 A | 5/1996 | Yamada | ...................... 358/438 |

(Continued)

FOREIGN PATENT DOCUMENTS

| JP | 8-242326 | 9/1976 | ............ H04N/1/00 |
| JP | 2-268557 | 11/1990 | ............ H04N/1/00 |
| JP | 4-142843 | 5/1992 | ........... H04L/12/54 |
| JP | 5-2541 | 1/1993 | ............ H04N/1/00 |
| JP | 5-14407 | 1/1993 | ............ H04N/1/00 |
| JP | 5-316309 | 11/1993 | ............ H04N/1/00 |
| JP | 5-347678 | 12/1993 | ............ H04N/1/00 |

(Continued)

OTHER PUBLICATIONS

Partial English translation of JP 5–14407.
Partial English translation of JP 6–141041.
English Language Abstract of JP 5–316309.

Primary Examiner—Jerome Grant, II
(74) Attorney, Agent, or Firm—Greenblum & Bernstein, P.L.C.

(57) ABSTRACT

A facsimile apparatus transmits facsimile data converted from e-mail data to a facsimile destination via a public communication network. A receiver receives the e-mail data from a requesting node. A memory stores a password and a domain name of a requesting node. An acquiring section acquires a destination address including at least a telephone number, a password and a domain name, from the requesting node. A converter converts the e-mail data into facsimile data. A comparator compares the password and the domain name acquired by the acquiring section, with the password and the domain name stored in the memory, respectively. A facsimile transmitter transmits the converted facsimile data to the facsimile destination designated by the telephone number when a result of the comparison indicates that the password and the domain name acquired are the same as the password and the domain name stored in said memory. Further, when a result of the comparison indicates that the password and the domain name acquired are not the same as the password and the domain name stored in the memory, the facsimile transmitter does not transmit the facsimile data to the facsimile destination.

10 Claims, 16 Drawing Sheets

U.S. PATENT DOCUMENTS

| | | | |
|---|---|---|---|
| 5,767,985 A | 6/1998 | Yamamoto | 358/402 |
| 5,802,510 A | 9/1998 | Jones | 707/2 |
| 5,812,278 A | 9/1998 | Toyoda | 358/402 |
| 5,881,233 A | 3/1999 | Toyoda | 395/200.48 |
| 5,895,468 A | 4/1999 | Whitmyer et al. | 707/10 |
| 5,905,777 A | 5/1999 | Foladare et al. | 379/90.01 |
| 5,960,404 A | 9/1999 | Chaar et al. | 705/8 |
| 6,088,125 A | 7/2000 | Okada | 358/1.15 |
| 6,205,363 B1 | 3/2001 | Miyasaka | 700/9 |
| 6,208,426 B1 | 3/2001 | Saito et al. | 358/1.15 |
| 6,211,972 B1 | 4/2001 | Okutomi et al. | 358/402 |
| 6,307,643 B1 | 10/2001 | Okada et al. | 358/1.15 |
| 6,658,093 B1 * | 12/2003 | Langseth | 379/88.17 |
| 2002/0046039 A1 * | 4/2002 | Ohta | 705/1 |
| 2002/0131073 A1 * | 9/2002 | Toyoda | 358/1.15 |
| 2003/0074265 A1 * | 4/2003 | Oshima | 705/26 |

FOREIGN PATENT DOCUMENTS

| | | | |
|---|---|---|---|
| JP | 6-141041 | 5/1994 | H04L/12/54 |
| JP | 6-243073 | 9/1994 | H04L/12/54 |
| JP | 8-130554 | 5/1996 | H04N/1/00 |
| JP | 9-265474 | 10/1997 | H04L/12/28 |
| JP | 1-122413 | 4/1999 | B28P/1/22 |

* cited by examiner

FIG. 5
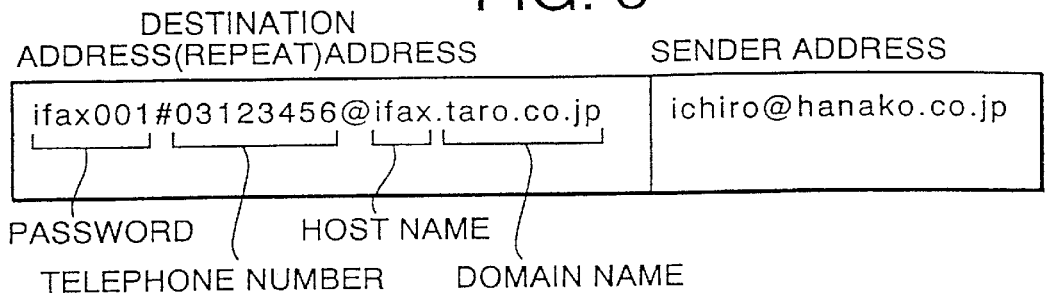
FIG. 6
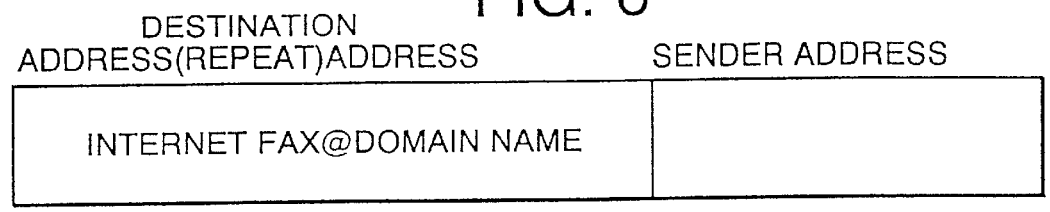
FIG. 7
| NUMBERS | DOMAIN NAMES | PASSWORDS |
|---|---|---|
| 1 | hanako.co.jp | ifax001 |
| 2 | mgcs.co.jp | ifax002 |
| 3 | mei.co.jp | ipc |
| 4 | ... | ... |
| 5 | ... | ... |
| 6 | ... | ... |
| 7 | ... | ... |
| 8 | ... | ... |
| 9 | ... | ... |
| 10 | ... | ... |
FIG. 8
| DESTINATION TELEPHONE NUMBER | SENDER ADDRESS |
|---|---|
| 0312345678 | ichiro@hanako.co.jp |

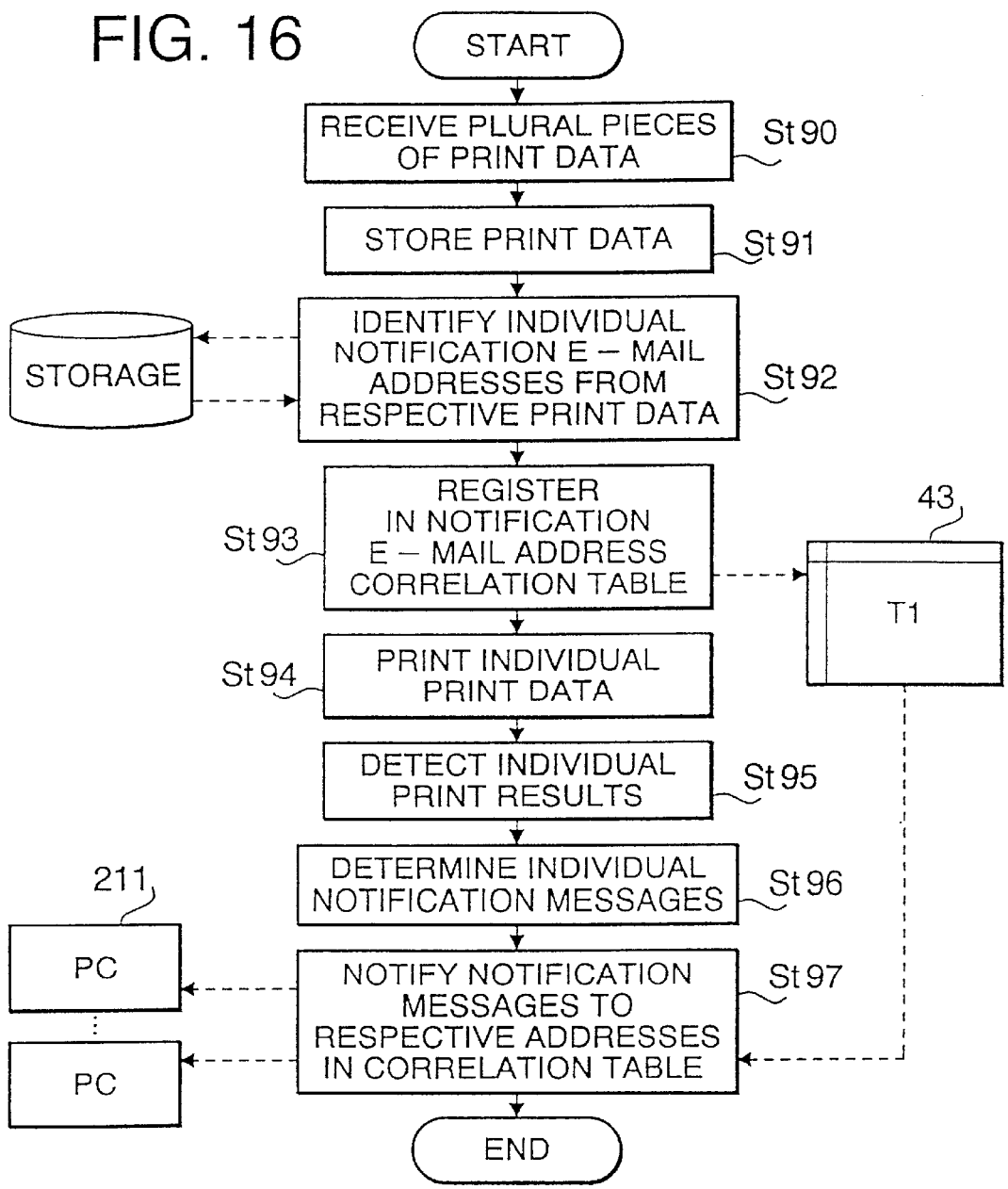

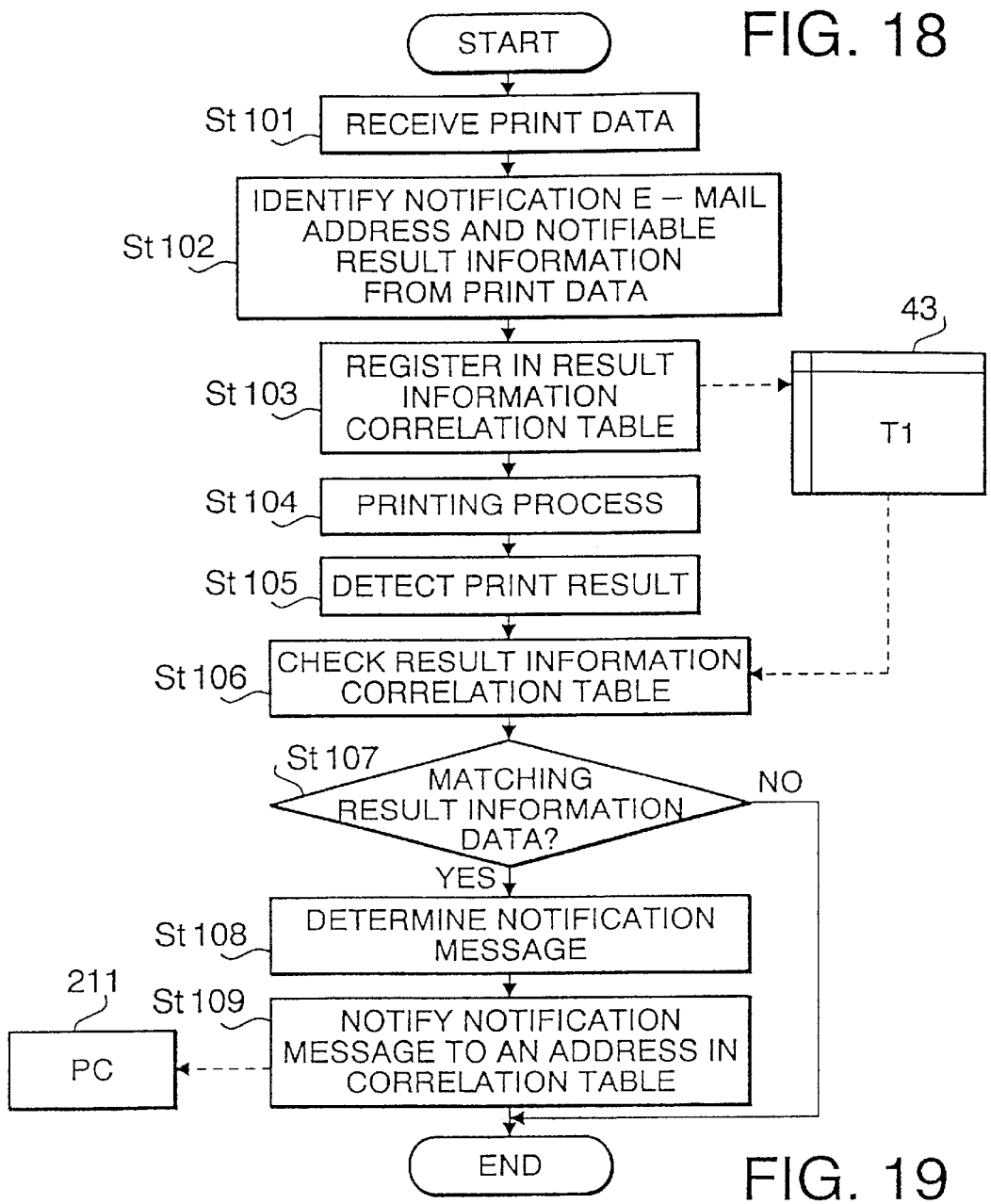

FIG. 23
| NUMBERS | MANAGER NOTIFICATION INFORMATION E – MAIL ADDRESSES | NOTIFIABLE RESULT |
|---|---|---|
| 1 | 123. 456. 789. 00 | PAPER JAM COMMUNICATION ERROR NO PAPER |
| 2 | 101. 202. 303. 44 | NETWORK ABNORMAL QUEUED FOR PRINTING |
| ⋮ | ⋮ | ⋮ |
| n | n | |
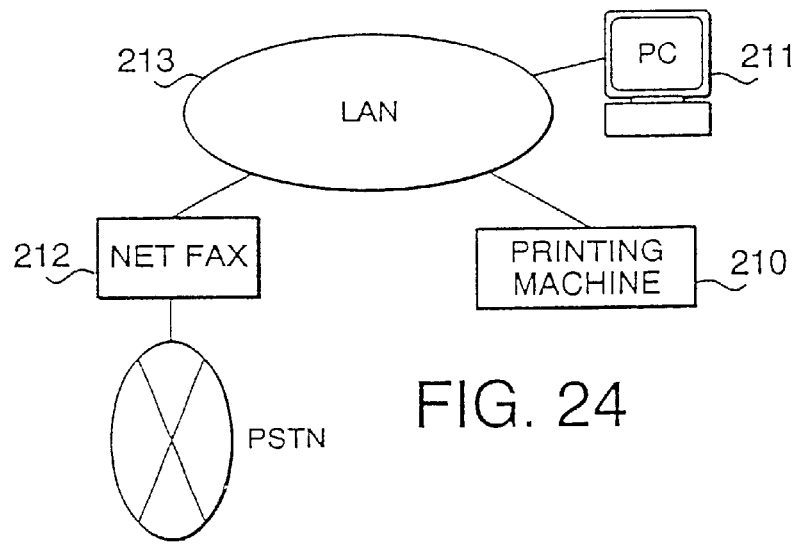
FIG. 24
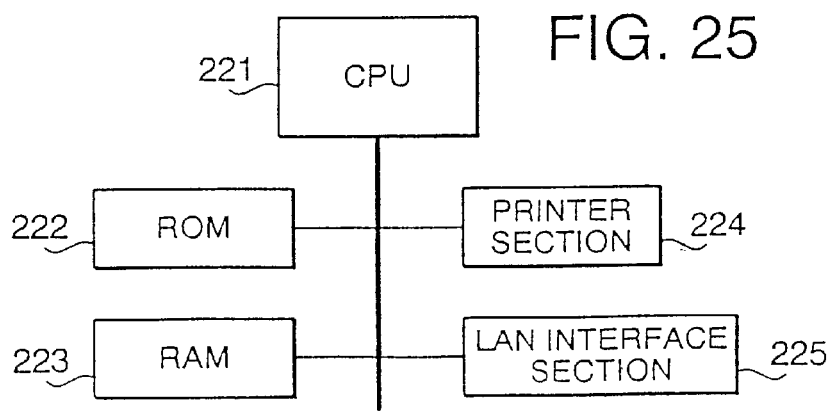
FIG. 25

NETWORK PRINTER

CROSS-REFERENCE TO RELATED APPLICATIONS

This application is a Divisional of U.S. application Ser. No. 09/476,326, filed Jan. 3, 2000, now U.S. Pat. No. 6,396,592 which is a Divisional of U.S. application Ser. No. 08/930,614, filed Oct. 14, 1997, which was the National Stage of International Application No. PCT/JP97/00866, filed Mar. 18, 1997, which is now U.S. Pat. No. 6,088,125, the contents all of which are herein incorporated by reference in their entireties. The International Application was not published under PCT Article 21(2) in English.

TECHNICAL FIELD

The present invention relates to a communication result notifying system which notifies the transmission result of repeated facsimile data or the process result of print data, received via a LAN, to the e-mail addresses of a facsimile transmission requesting node, a print requesting node and a manager node.

BACKGROUND ART

Popular is a system in which a printing machine and a facsimile machine are connected to a LAN (Local Area Network), and a personal computer connected to the LAN can request the printing machine and the facsimile machine to execute printing and facsimile transmission.

In this system, typically, the printing machine and facsimile machine execute and terminate respective processes requested by the personal computer. When out of paper, paper jam or the like occurs, an alarm message is displayed on a display section of the printing machine or the facsimile machine. There is a facsimile machine equipped with a function to provide a facsimile output (printout) of alarm information. A requester who has requested, through a personal computer, the printing machine or the facsimile machine to perform printing or facsimile transmission considers that the process has been terminated properly unless an alarm message is displayed on the display section.

FIG. 24 shows the network structure of a LAN to which a printing machine and a facsimile machine are connected, and FIG. 25 shows the functional blocks of a conventional printing machine. A printing machine 210, a personal computer 211 and a network connection type facsimile machine (hereinafter called "NETFAX") 212 are connected on a LAN 213.

The printing machine 210 has a CPU 221 for performing the general control of the machine, a ROM 222 where a program is stored, a RAM 223 which the program uses as a work area, a printer section 224 which executes a printing process with a printer protocol of an LPD or the like, and a LAN interface section 225 which exchanges print data on the LAN.

The NETFAX 212 has a FAX section which executes transmission and reception processes on print facsimile data in place of the printer section 224. Hereinafter, an information processing terminal through which a requester requests the NETFAX or the printing machine to do facsimile transmission or a printing process is called a requesting node. The personal computer 211 becomes a requesting node.

The requesting node 211 makes a request on a printing process to the printing machine 210, and the printing machine 210 which has received the request acquires print data via the LAN 213 and prints it. Further, the requesting node 211 request the NETFAX 212 to execute facsimile transmission and send facsimile data via the LAN 213, and the NETFAX 212 sends the facsimile data by facsimile to another facsimile machine designated by the telephone number via a public telecommunication network (PSTN).

According to the above-described prior art, however, unless the requester directly goes over to where the NETFAX is located and checks its display section after the requesting node 211 has made a request of facsimile transmission to the NETFAX 212, it is not possible to know if the facsimile transmission has been terminated properly.

Even when a message indicative of abnormality is printed out from the NETFAX, there is a time lag from the point of the request of facsimile transmission to the point at which the message indicating abnormality is printed out and returned. Therefore, it is probable that the requester would not been informed of the event that facsimile transmission has not been made properly for a long time.

There is a case where facsimile transmission having been done should be reported to more than one supervisors besides the requester who has requested the facsimile transmission. In such a case, it would be troublesome to report the result of facsimile transmission to each supervisor or leave a memo describing the result of facsimile transmission to an absent supervisor.

The same inconvenience as would occur in the case of facsimile transmission also occurs in the case where the requesting node 211 makes a printing request to the printing machine 210.

In the case of a printing process, when the print data one has requested is not printed for a long time even with no alarm message displayed on the main body, even if it is a print queuing mode due to heavy queues, the status cannot be known unless it is checked by a queue check command. This requires a trouble of going over to the printer and checking it over and over again with intervals.

Further, since all abnormalities are not displayed on the display section, even when there is a result which one wants to know immediately though it is not displayed on the display section, he may not be able to find out it until the problem is overcome forcibly by reactivation or the like.

DISCLOSURE OF INVENTION

It is therefore an object of the present invention to overcome the conventional problems and provide a facsimile machine and a communication result notifying method that allow a NETFAX or a printing machine to promptly notify the process result of a facsimile transmission process or printing process requested via a LAN, to a requesting node or a manager node which has requested the notification of the process result, and that can make efficient the work of notifying the result of a process requested via a network.

According to this invention, a facsimile machine for transmitting facsimile data, received via a LAN from a requesting node, to a destination specified by the requesting node, by facsimile, comprises an acquisition section for acquiring facsimile data sent on the LAN from the requesting node from the LAN; an extraction section for obtaining an e-mail address of a notification destination node, to which a process result of facsimile transmission is to be notified, from the acquired facsimile data; a detection section for detecting a process result of a transmission process performed on the facsimile data; and a notification section for notifying the detected process result to the e-mail address of the notification destination node by e-mail.

According to this invention, a printing machine for printing print data, received via a LAN from a requesting node, comprises an acquisition section for acquiring print data sent on the LAN from the requesting node from the LAN; an extraction section for obtaining an e-mail address of a notification destination node, to which a process result of a printing process is to be notified, from the acquired print data; a detection section for detecting a process result of a printing process performed on the print data; and a notification section for notifying the detected process result to the e-mail address of the notification destination node by e-mail.

According to the thus constituted facsimile machine and printing machine, as a notification e-mail address can be identified from received data, the result can be notified by e-mail in both cases where the result of facsimile transmission or a printing process is normal and abnormal. The one who requests a transmission process or a printing process can know the result on the site. It is also possible to eliminate a wasteful work of going over to the facsimile machine or printing machine and checking it over and over again.

The facsimile machine according to this invention comprises an accumulation section for accumulating plural pieces of facsimile data acquired from the LAN; a table for storing e-mail addresses of notification destination nodes, extracted from the facsimile data, in association with the facsimile data as extraction sources; and a function for acquiring an e-mail address of a notification destination node associated with facsimile data whose process result has been detected, from the table and notifying it to the notification section.

The printing machine according to this invention comprises an accumulation section for accumulating plural pieces of print data acquired from the LAN; a table for storing e-mail addresses of notification destination nodes, extracted from the print data, in association with the print data as extraction sources; and a function for acquiring an e-mail address of a notification destination node associated with print data whose process result has been detected, from the table and notifying it to the notification section.

According to the thus constituted facsimile machine and printing machine, in the case where there are a plurality of requesters who request facsimile transmission or a printing process and there are plural pieces of data to be received, process results of individual data can individually be notified to notification e-mail addresses added to the respective data, so that a process requesting side can obtain only the result of the process it has requested. Further, one process requester can request a plurality of data processes and a file name can be notified in addition to the process result, so that it is possible to know which process has been terminated properly and which process is abnormal on the site.

The facsimile machine according to this invention comprises an extraction section for extracting process result items notifiable to the notification destination node from facsimile data obtained from the LAN; and an instruction section for, if an item matching with a detected process result is included in the process result items, instructing the notifying means to notify that process result to the notification destination node.

The printing machine according to this invention comprises an extraction section for extracting process result items notifiable to the notification destination node from print data obtained from the LAN; and an instruction section for, if an item matching with a detected process result is included in the process result items, instructing the notifying means to notify that process result to the notification destination node.

According to the thus constituted facsimile machine and printing machine, the type of result information which can ensure notification is identifiable from the received facsimile data or print data, in addition to a notification e-mail address, so that the result can be notified only when it matches with the result of the transmission process or printing process. A process requesting side can dynamically designate the type of result information which it wants to be notified upon occurrence.

In the case where the process result items extracted from the facsimile data include an item queued for transmission, when a facsimile transmission queue state is detected, the facsimile machine according to this invention notifies attribute information including the number of queues and a queue size to the e-mail address of the notification destination node immediately upon reception of facsimile data.

In the case where the process result items extracted from the print data include an item queued for printing, when a printing queue state is detected, the printing machine according to this invention notifies attribute information including the number of queues and a queue size to the e-mail address of the notification destination node immediately upon reception of print data.

According to the thus constituted facsimile machine and printing machine, when the type of notifiable result information affixed into facsimile data or print data matches with a process result as "print queuing," the "print queuing" state and the number of queues and the queue size as its attribute information are notified to the notification e-mail address. Therefore, the process requesting side can understand the reason why proper termination is not notified and at the same time can roughly estimate how long it takes to execute the process and to notify the message of proper termination. This can eliminate a troublesome work of going over to the printer to check the state over and over again at proper timings, or checking the print queue state by a queue check command with intervals, when print data is not printed for a long time.

The facsimile machine according to this invention comprises a reception section for receiving an information via the LAN; an extraction section for extracting an e-mail address of a manager node from the received e-mail; a memory for storing the e-mail address of the manager node; and a notification section for notifying the detected process result to the e-mail address of the manager node by e-mail.

The printing machine according to this invention comprises a reception section for receiving an information via the LAN; an extraction section for extracting an e-mail address of a manager node from the received e-mail; a memory for storing the e-mail address of the manager node; and a notification section for notifying the detected process result to the e-mail address of the manager node by e-mail.

According to the thus constituted facsimile machine and printing machine, one or more manager notification e-mail addresses can be registered previously by e-mail, so that when, depending on the type of a process result, it is desirable to notify the result to a process requesting side and one or more managers, the result can be notified simultaneously. Further, it is possible to notify process results occurred to separate managers in accordance with the process results by associating manager notification e-mail addresses with notifiable result information affixed to data. Furthermore, since a plurality of manager notification e-mail addresses can be registered, one result information can be notified to a plurality of managers or plural pieces of result information can be notified to one manager. When a special result occurs, it becomes unnecessary to report it to each manager.

BRIEF DESCRIPTION OF DRAWINGS

FIG. 5 is a diagram showing a repeat address affixed to mail data in the second embodiment;

FIG. 6 is a diagram showing a printing address affixed to mail data in the second embodiment;

FIG. 7 is a structural diagram of a management table of passwords and domain names;

FIG. 8 is a diagram depicting a destination telephone number and a sender address acquired from facsimile data;

FIG. 16 is a flowchart illustrating procedures of notifying individual print results to a plurality of notification e-mail addresses according to the fourth embodiment;

FIG. 17 is a diagram of a table of print data associated with notification e-mail addresses in the fourth embodiment;

FIG. 18 is a flowchart illustrating procedures of notifying a result when a print result matches with notifiable result information according to the fifth embodiment;

FIG. 19 is a diagram of a table of notification e-mail addresses associated with notifiable result information in the fifth embodiment;

FIG. 23 is a diagram of a table of manager notification e-mail addresses associated with notifiable result information in the eighth embodiment;

FIG. 24 is a structural diagram of an existing system which executes printing and facsimile transmission via a LAN; and FIG. 25 is a functional block diagram of a conventional printing machine.

BEST MODES FOR CARRYING OUT THE INVENTION

Embodiments of the present invention will now be described with reference to the accompanying drawings.

First Embodiment

The first embodiment is a communication result notifying system which notifies the process result of facsimile transmission to a requesting node by e-mail from a NETFAX. A description will be given of the network structure shown in FIG. 24 as an example.

Figure 1:
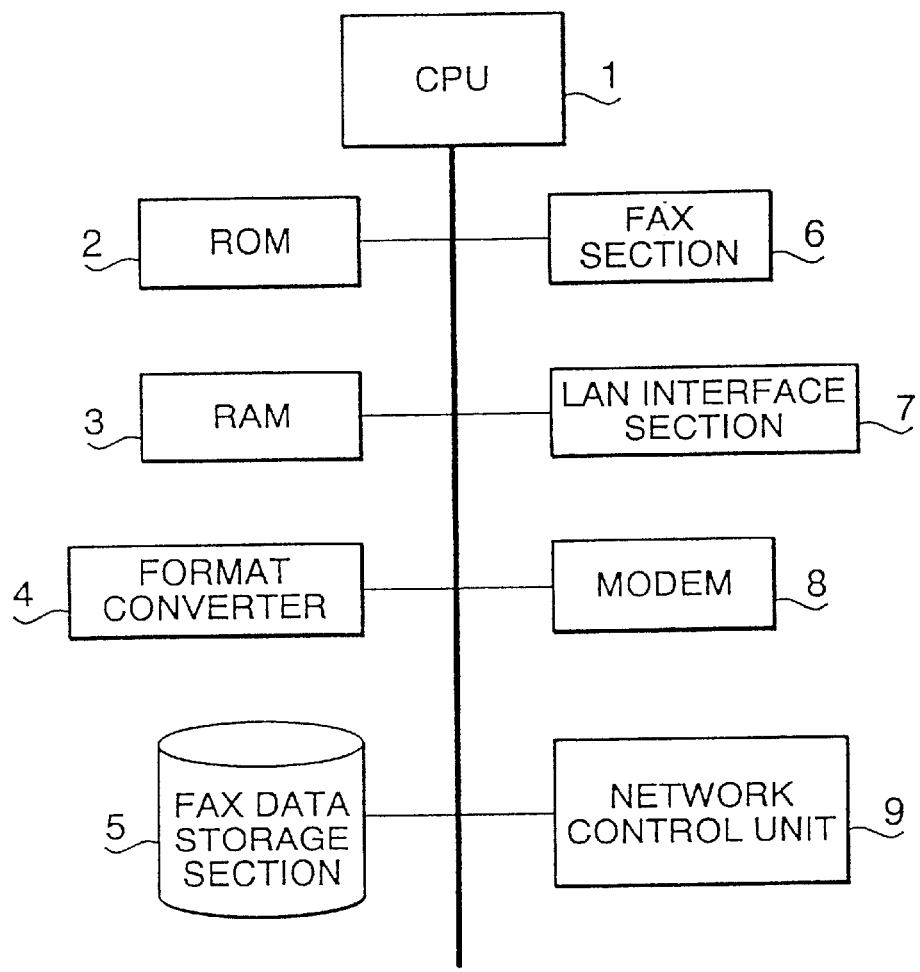
FIG. 1 is a functional block diagram of a facsimile machine in a communication result notifying system according to the first embodiment.

FIG. 1 shows the functional blocks of the NETFAX in the communication result notifying system. This NETFAX has a CPU 1 for performing the general control of the machine, a ROM 2 where a program is stored, a RAM 3 which the program uses as a work area, a format converter 4, a facsimile data storage section 5, a facsimile section 6, a LAN interface section 7, a modem 8 and a network control unit 9.

The LAN interface section 7 executes procedures necessary to acquire facsimile data from a LAN. The format converter 4 converts image data of a transmission original received via the LAN to the format of a G3 facsimile. The received facsimile data is temporarily stored in the facsimile data storage section 5. The facsimile section 6 performs transmission and reception of facsimile data. The modem 8 performs modulation or demodulation necessary for data transmission and reception, and the network control unit 9 controls the line.

Figure 2:
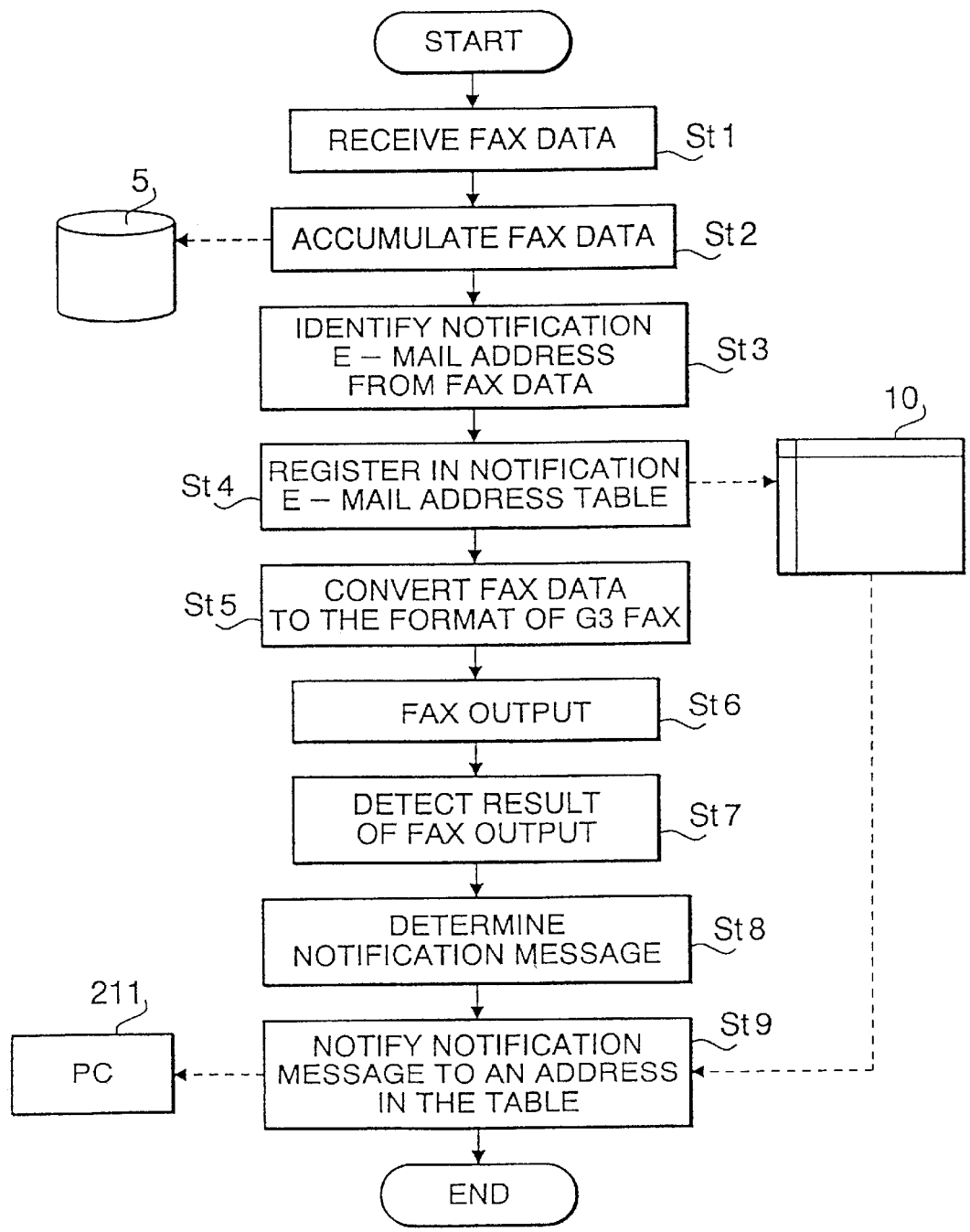
FIG. 2 is a flowchart illustrating procedures of notifying a facsimile output result to a notification e-mail address.

FIG. 2 is a flowchart illustrating a process of notifying the result of a facsimile transmission process to a notification e-mail address. When the result of facsimile transmission process is to be notified to a requesting node (211) from the NETFAX (212) in FIG. 24, the requesting node adds the e-mail address of the requesting node on the network to the header section of facsimile data and sends it out.

In the NETFAX, the LAN interface section 7 receives facsimile data, sent via the LAN from the requesting node (St 1), and temporarily stores the received facsimile data in the facsimile data storage section 5 (St 2).

The CPU 1 identifies a notification e-mail address, affixed to the received facsimile data, from the data (St 3), and registers the notification e-mail address in a table 10 provided in the RAM 3 (St 4). The format converter 4 converts image data received as facsimile data to the format of the G3 facsimile (St 5).

Meanwhile, the CPU 1 instructs the facsimile section 6 to perform a facsimile transmission process requested by the requesting node. The facsimile section 6 performs a transmission process on facsimile data whose format has been converted in accordance with the G3 facsimile (St 6). After giving an instruction for the facsimile transmission process to the facsimile section 6, the CPU 1 detects the result of a facsimile reception process (St 8).

A notification message based on the process result in the facsimile section 6 is determined from previously registered notification messages (St 8), and it is notified by e-mail to a notification e-mail address registered in the table 10 (St 9). As the requesting node 211 is set to the notification e-mail address here, the e-mail of the notification message is sent to the e-mail address of the requesting node 211.

According to the first embodiment, the result of a facsimile transmission process is notified by e-mail to the facsimile transmission requesting node. When facsimile transmission has been terminated properly, therefore, the facsimile transmission requesting node can receive a communication result indicating the proper termination, whereas in the case of abnormal transmission, the facsimile transmission requesting node can receive a communication result indicating the occurrence of a transmission error. The requester need not go over to the location of the facsimile machine himself and check the display content (alarm message) on the display section. It is possible to prevent a message of non-arrival or the like, when displayed on the display section, from being properly reported due to failure to check the display section or the like.

A description will now be given of the case where the NETFAX transfers the result of reception of facsimile data, received from the PSTN, to a reception node on the LAN by e-mail.

A transmission node which transmits facsimile data adds the e-mail address of the reception node on the network to the header section of facsimile data and sends it out.

In the NETFAX, the facsimile section 6 receives facsimile data from the PSTN (St 21), and temporarily stores the facsimile data in the facsimile data storage section 5 (St 22). The CPU 1 identifies the notification e-mail address of the reception node, inserted in the header section of the received facsimile data, from the data (St 23), and registers the notification e-mail address in the table 10 provided in the RAM 3 (St 24).

When one page or whole pages of facsimile data are saved in the facsimile data storage section 5, printing of image data is initiated (St 25). Through the processes from the reception of facsimile data to printing thereof, the facsimile reception process is terminated.

The result of the facsimile reception process is detected (St 26), and a notification message based on the process result in the facsimile section 6 is determined from previously registered notification messages (St 27). Then, the notification message is notified by e-mail to the e-mail address of the reception node registered in the table 10 (St 28).

According to this first embodiment, since the result of the facsimile reception process is notified to the reception node by e-mail, it is possible to permit the reception node to know when facsimile data has arrived and obtain it immediately upon arrival by facsimile, and to overcome such a problem that transmitted facsimile data does not reach the transmission destination for a long time.

Second Embodiment

Figure 3:
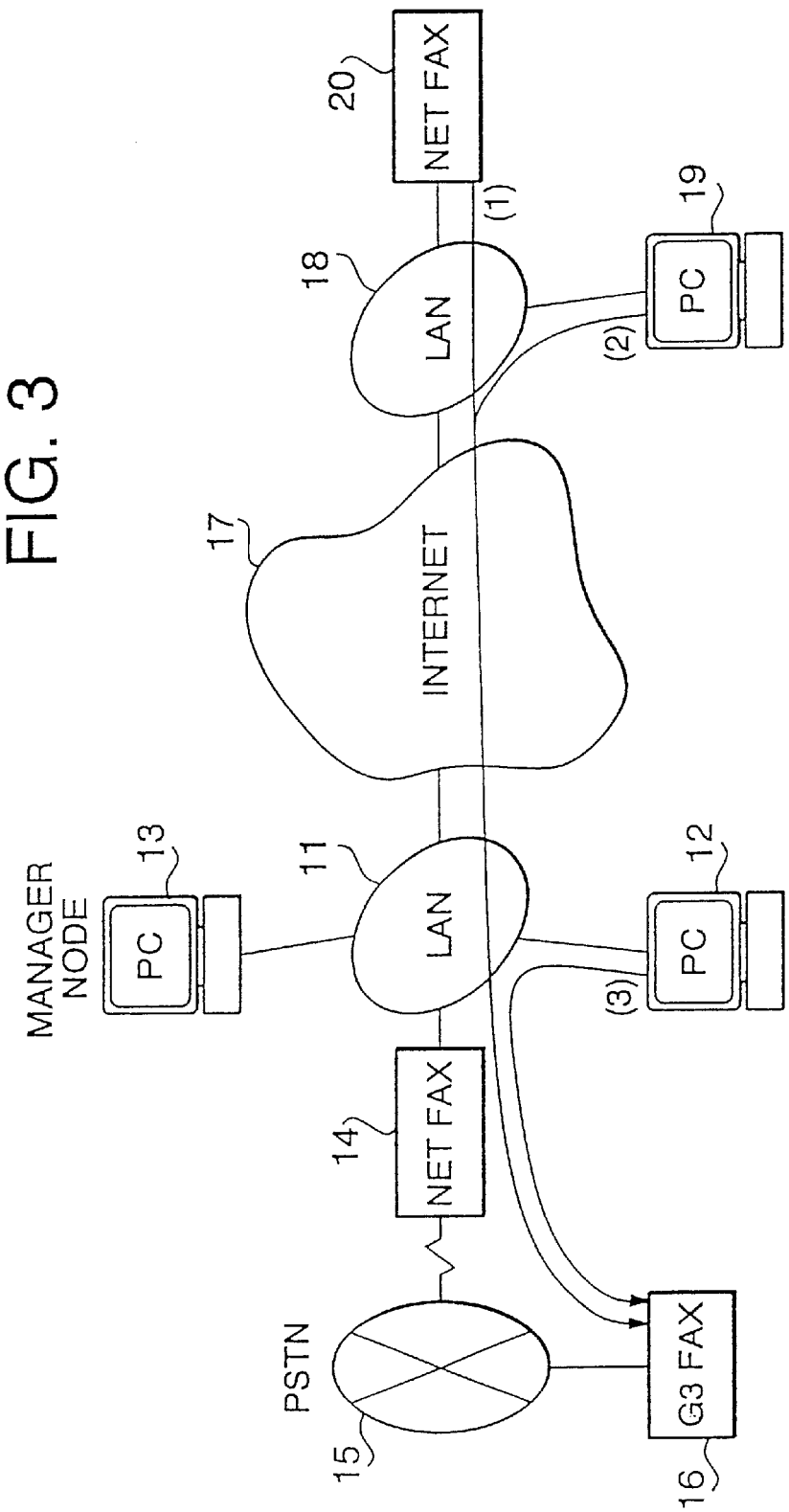
FIG. 3 is a network structural diagram showing requesting routines to a facsimile machine in a communication result notifying system according to the second embodiment.

FIG. 3 exemplifies the structure of a communication network which is adapted to a communication result notifying system according to the second embodiment. A first requesting node 12 constituted by a personal computer (PC), a manager node 13 and a NETFAX 16 are connected to a LAN 11. The NETFAX 14 is connected via a PSTN 15 to a G3 FAX 16 to ensure facsimile communication over a telephone line. A plurality of LANs belong to an Internet 17 to which the LAN 11 is connected, and another requesting node 19 and NETFAX 20 are present on a LAN 18, one of the LANs. The following description will be given on the assumption that the NETFAX 14 repeats and prints facsimile data.

Figure 4:
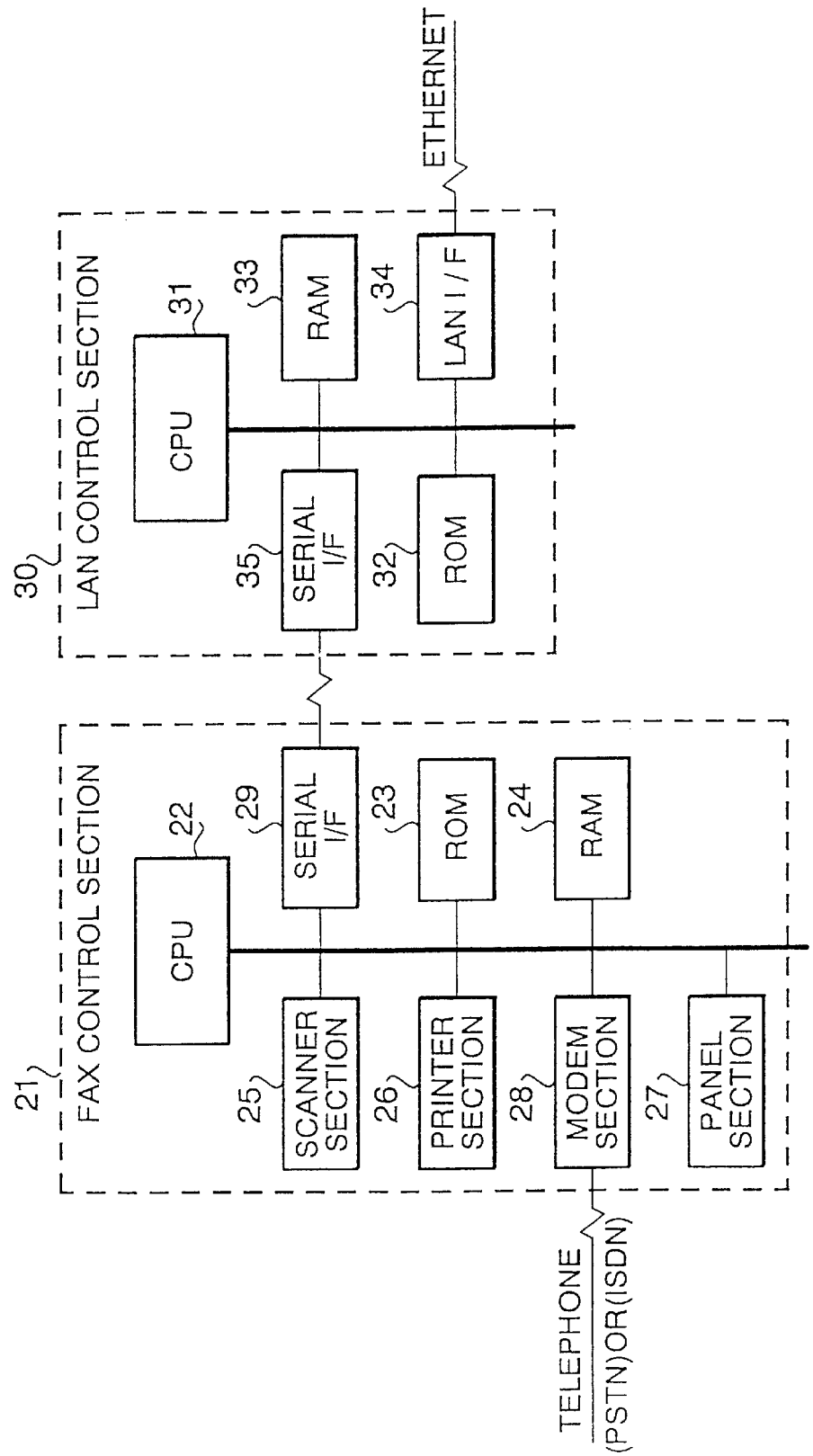
FIG. 4 is a functional block diagram of the facsimile machine in a communication result notifying system according to the second embodiment.

FIG. 4 shows the functional blocks of the NETFAX 14. The NETFAX 14 has a FAX control section 21 and a LAN control section 30. The FAX control section 21 has a CPU 22 which mainly controls facsimile transmission and reception processes and a transmission result notifying process, a ROM 23 where a program to be executed by the CPU 22 is stored, and a RAM 24 where various tables are registered or which is used as a work area. The FAX control section 21 further includes a scanner section 25 for scanning a transmission original, a printer section 26 for printing image data, a panel section 27 through which various information such as a telephone number and an e-mail address can be input, a modem 28 for modulating and demodulating facsimile data, and a serial interface 29 which exchanges data with the LAN control section 30. The LAN control section 30 has a CPU 31 which mainly controls the exchange of facsimile data with the LAN 11, a ROM 32 where a program for operating the CPU 31 is stored, a RAM 33 in which data the program uses is stored, a LAN interface 34 for connecting to the LAN 11 of Ethernet or the like, and a serial interface 35 for connecting to the FAX control section 21.

When the requesting node (12, 19, 20) requests the NETFAX 14 to repeat or print facsimile data, the requesting node transforms facsimile data or print data to an e-mail or a frame and sends it to a data stream of the LAN 11. The requesting node sets either a printing address or a repeat address to the destination address of the e-mail or frame which carries the facsimile data or print data, in accordance with the data content.

FIG. 5 shows a specific example of a repeat address. This repeat address consists of a password for repeating facsimile data to the NETFAX 14, the telephone number of the destination, the G3 FAX 16, and the host name and domain name of the NETFAX 14. Of the destination address, the portion sandwiched between # and @ indicates the telephone number of the destination, the G3 FAX 16. FIG. 6 shows a specific example of a printing address. The NETFAX 14 identifies a repeat address and a printing address based on the arrangement of data in the destination address.

The NETFAX 14 is provided with a mechanism which does not accept repeating from other than specific requesting nodes previously registered. A management table where the domain names and passwords of the requesting nodes repeating to which is executed by the NETFAX 14 are registered has been prepared in advance, and stored in the RAM 24 in the FAX control section 21.

FIG. 7 shows the structure of the management table. In the case where only a repeat along a path 3 on the network structure in FIG. 3 is permitted and repeats along paths 1 and 2 are not allowed, the domain name of the requesting node on the path 3 alone is registered in the management table.

Figure 9:
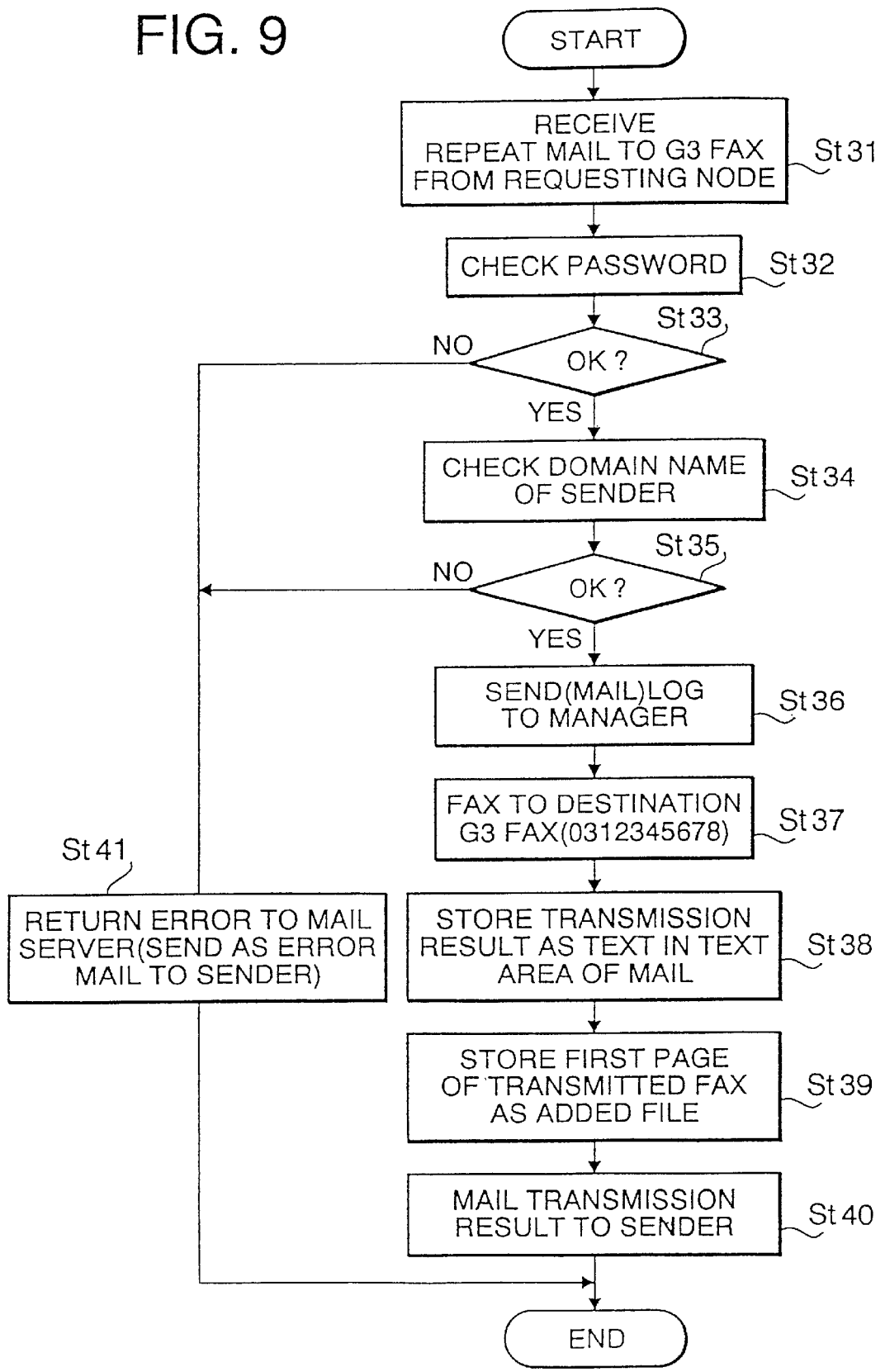
FIG. 9 is a flowchart illustrating general procedures of notifying a transmission result to a notification e-mail address in the second embodiment.
Figure 10:
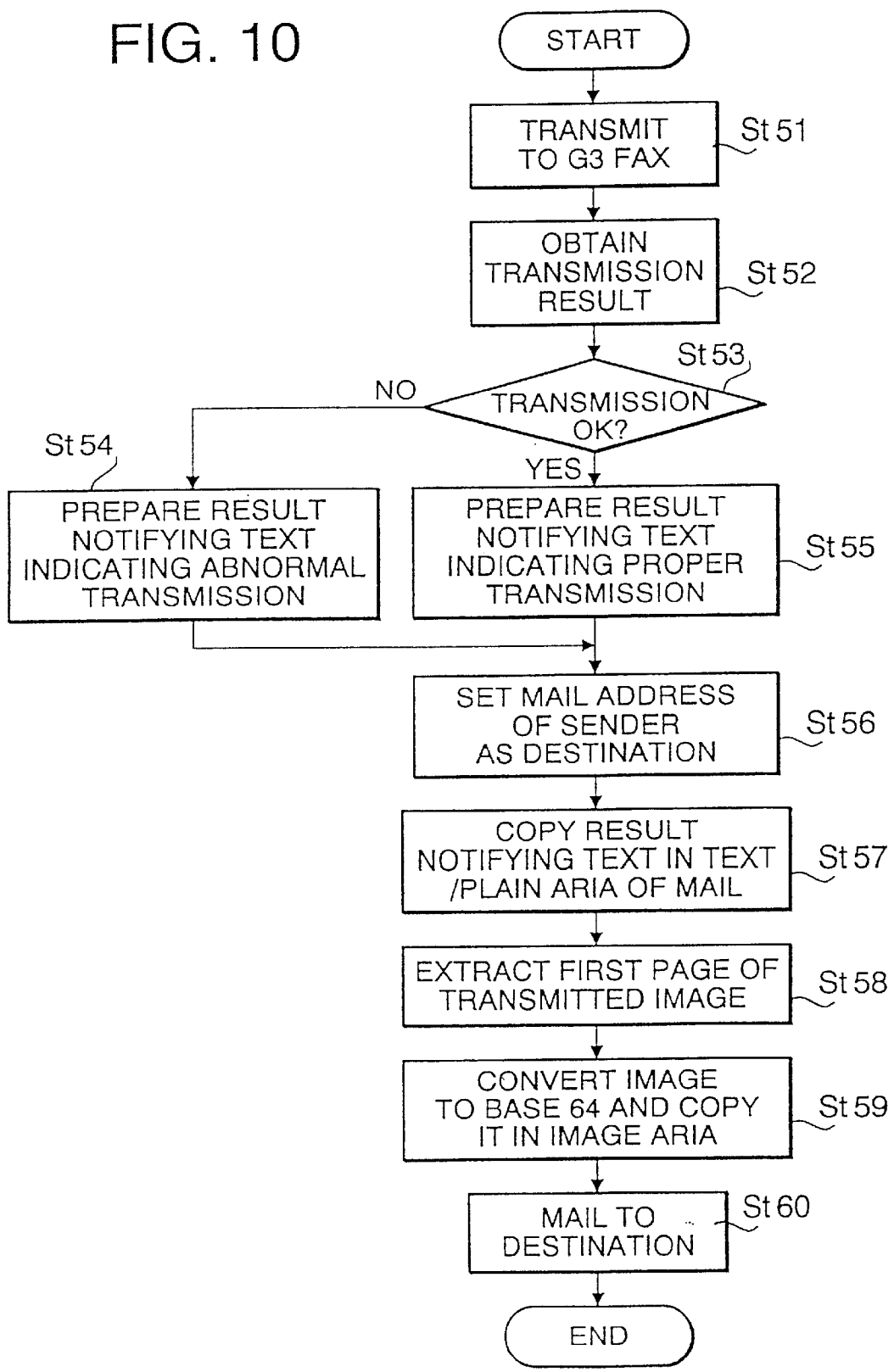
FIG. 10 is a flowchart illustrating procedures of mailing a transmission result in the second embodiment.

FIGS. 9 and 10 present flowcharts for repeating process of facsimile data in the NETFAX 14. The management table shown in FIG. 7 is stored, backed up, in the RAM 24 of the facsimile control section 21 and is transferred to the LAN control section 30 at the time of activation.

A description will be given of the case where the requesting node (personal computer) 12 in the LAN 11 requests the NETFAX 14 to repeat facsimile data to the G3 FAX 16. The requesting node 12 transmits data to be sent as facsimile data to the NETFAX 14 in the format of an e-mail. At this time, the repeat address and sender address shown in FIG. 5 are set in the e-mail at the requesting node 12.

The NETFAX receives the e-mail of facsimile data to be repeated to the G3 FAX 16 from the requesting node 12, at a repeat-only telephone number (St 31). The facsimile data portion (text data, image data) included in the received e-mail is converted to the format of facsimile data.

Next, the password is checked by referring to the management table transferred to the RAM 33 in the LAN control section 30 (St 32). The password (ifax 001) placed at the top of the repeat address shown in FIG. 5 is obtained and is collated with the passwords registered in the management table. If the presence of a matched password in the management table can be confirmed, it is determined that the password is correct (St 33). When the password is correct, the domain name of the sender is checked by further referring to the management table (St 34). The domain name described in the sender address in the received e-mail is acquired and is collated with the domain name on the management table which is associated with the previously checked password. If the sender's domain name is registered in the management table, it is determined that facsimile data of the received e-mail may be repeated (St 35). A plurality of domain names can be registered for a single password.

Since passwords for using the NETFAX 14 for repeating are given to specific requesters and they are registered in the management table, the NETFAX 14 can accept repeat requests only from the specific requesters.

Even if a repeat address including a password is leaked to a third party, unauthorized use of the NETFAX 14 can be prevented by restricting the domain name of the sender in the process in step 34.

When it is determined in the step 35 that mail data from the requesting node 12 may be repeated, the mail data is sent to the facsimile control section 21 from the LAN control section 30 via the serial interface 35.

The facsimile control section 21 obtains the destination telephone number sandwiched between the mark # and the mark @ from the repeat address in the mail data, and temporarily stores the destination telephone number and the mail data in the RAM 24. The facsimile control section 21 sends a log to the manager node 13 of a manager who manages the NETFAX (St 36). The log to be transmitted to the manager node 13 includes the sender, the destination telephone number and the content of data or the like. As the sender address and the telephone number of the transmission destination are notified to the manager node 13 every time there is a repeat, it is possible to promptly check the situation where the repeating amount is increased abnormally.

Next, the destination telephone number previously held in the RAM 24 is called and mail data whose format has been converted for facsimile usage is transmitted by facsimile (St 37). Then, text data indicating the transmission result is stored in the text portion in the e-mail (St 38), and the first page transmitted by facsimile is stored as an appendid file in the e-mail (St 39). The e-mail having stored the transmission result and the first page is transmitted to the sender address (St 40).

When the password or domain name is wrong in step 33 or 35, an error is returned to the mail server (St 41). An error mail is returned to the requesting node from the mail server.

Referring to FIG. 10, the notification process for notifying the communication result to the requesting node will be described in detail. This communication result notifying process is equivalent to the steps 38–40.

When the requesting node 12 requests the NETFAX 14 to make repeating, the NETFAX 14 converts an e-mail to facsimile data (image data). At this time, the destination telephone number and the sender address are acquired from the destination address and the sender address in the mail data, a management table as shown in FIG. 8 is prepared and the destination telephone number is called to transmit the facsimile data to the requested destination (St 51).

The NETFAX 14 detects the transmission result in the same process as that of an existing facsimile machine (St 52). Transmission OK is stored as a transmission and reception history in a memory (e.g., a part of the RAM 24) for display on the display section when transmission has been terminated properly, and transmission NG is stored when transmission could not be accomplished.

When the transmission history is stored in the memory in the process in step 52, the content of the transmission result is checked (St 53). In the case of transmission NG, text data of a message indicating abnormal transmission is read from the memory (St 54). In the case of transmission OK, text data of a message indicating transmission completed is read from the memory (St 55).

Although text data is read from the memory both in the case of transmission completed and in the case of abnormal transmission, it may be done only in one of the cases.

When text data corresponding to abnormal transmission or text data corresponding to transmission completed is prepared, the sender address, stored in the management table shown in FIG. 8 at the time the mail data to be repeated has been received from the requesting node, is obtained from the management table. The address of the requesting node 12, or the sender address, is set as the mail address for the communication result mail (St 56). The text data of the communication result message prepared in the step 54, 55 is copied to the text/Plain portion of the communication result mail (St 57). Further, the first page of the image data transmitted in step 51 upon reception of a repeat request is extracted (St 58) and the extracted image data is copied to the image portion after Base 64 conversion (St 59). That is, the extracted image data is transformed into a file and added.

Then, the text data of the communication result message is inserted in the text portion and the e-mail having the first page of image data added to the image portion is mailed to the sender address which is the address of the requesting node (St 60).

As a result, when the requesting node 12 request the NETFAX 14 to make a repeat to the G3 FAX 16, the e-mail added with the communication result message and the first page of image data is sent from the NETFAX 14 when the transmission process is completed. Therefore, the requester can know the transmission result immediately after the transmission process without going over to where the NETFAX 14 is located to check the transmission result.

In the case where a repeat request is made with a false sender (domain name), the transmission result notification is returned to the sender set in the mail data, so that the transmission result notification is not returned to the node which has made a false transmission request. It is thus possible to eliminate a false requester from the service of notifying the result. Since the transmission result of a mail which is not requested by the node of a third party whose domain name has been used unauthorized is notified to that node, the third party can find out the unauthorized use of its domain name.

Figure 11:
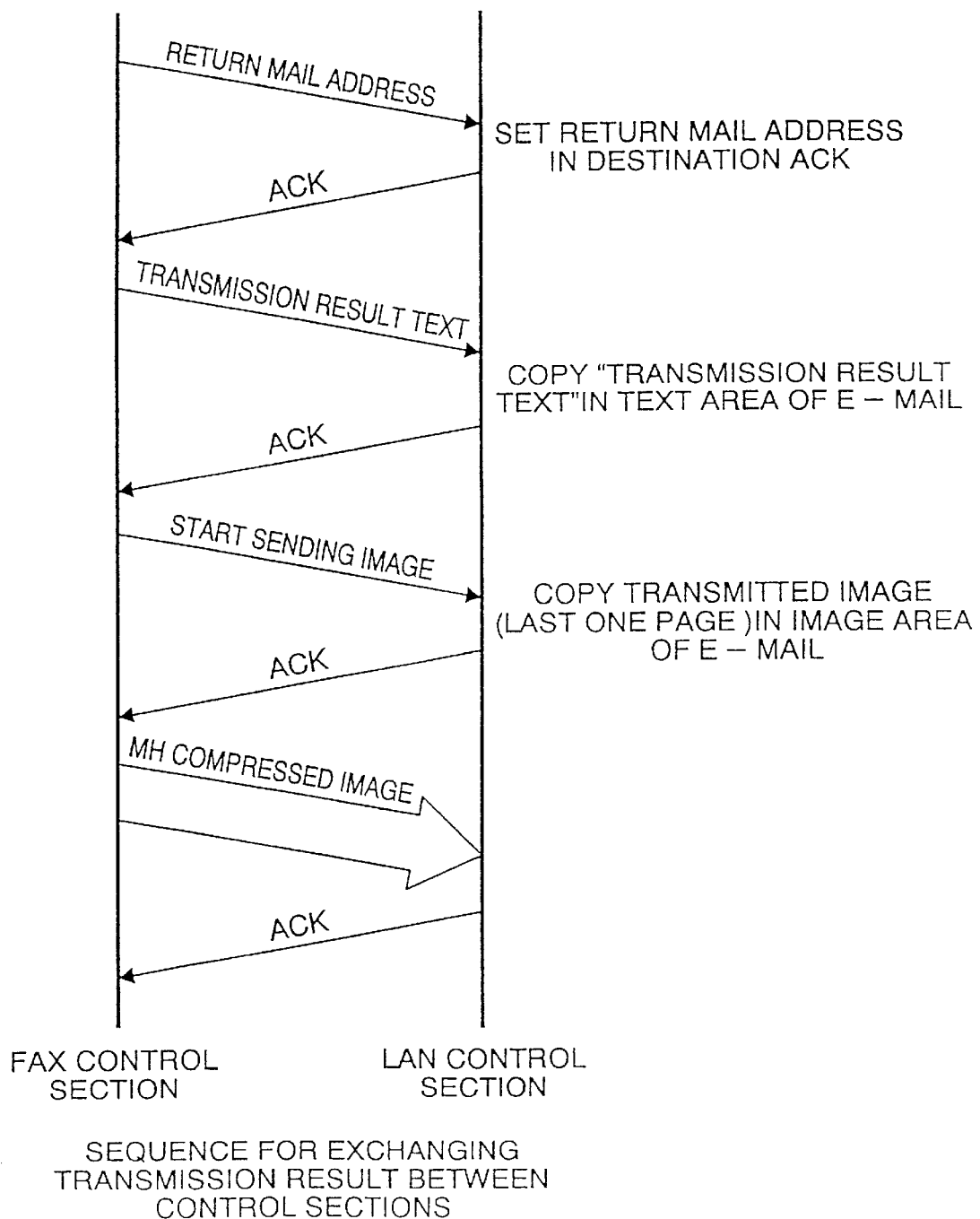
FIG. 11 is a sequence diagram for exchanging a transmission result between control sections.

FIG. 11 shows a sequence for exchanging a transmission result or the like to the LAN control section 30 from the facsimile control section 21. Every mail data the NETFAX 14 received from a requesting node is managed by the facsimile control section 21. When a sender address in the management table is given as a return mail address from the facsimile control section 21, the LAN control section 30 sets the return mail address to the destination of the result notifying mail. When a transmission result text is given to the LAN control section 30 from the facsimile control section 21, the transmission result text is copied into the text portion of the result notifying mail.

As apparent from the above, the management of all data by the facsimile control section 21 can ensure complicated control and can permit transmission confirmation to be executed under the same control as that for ordinary mail transmission, so that the program structure can be simplified. Further, as the CPU performance of the ordinary facsimile control section 21 is higher than that of the LAN control section 30, greater data can be handled when data is managed by the facsimile control section 21.

Third Embodiment

The third embodiment is a communication result notifying system in which a printing machine which has received a printing request via a network notifies the result of the printing process by e-mail. The printing machine in the communication result notifying system according to the third embodiment is located on a network shown in FIG. 24 and receives print data via the network.

Figure 12:
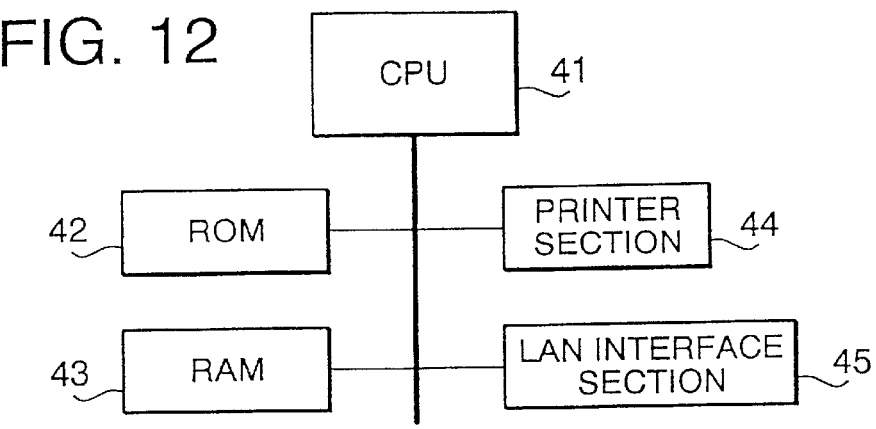
FIG. 12 is a functional block diagram of a printing machine in a communication result notifying system according to the third embodiment.

FIG. 12 is a basic structural diagram of the printing machine in the communication result notifying system according to the third embodiment. The printing machine has a CPU 41 which performs the general control of the machine, a ROM 42 where a program having process contents or the like described therein is stored, a RAM 43 which is used as a data area by the program, a printer section 44 which executes a printing process with a printer protocol of an LPD or the like, and a LAN interface section 45 which exchanges print data on the LAN.

Figure 13:
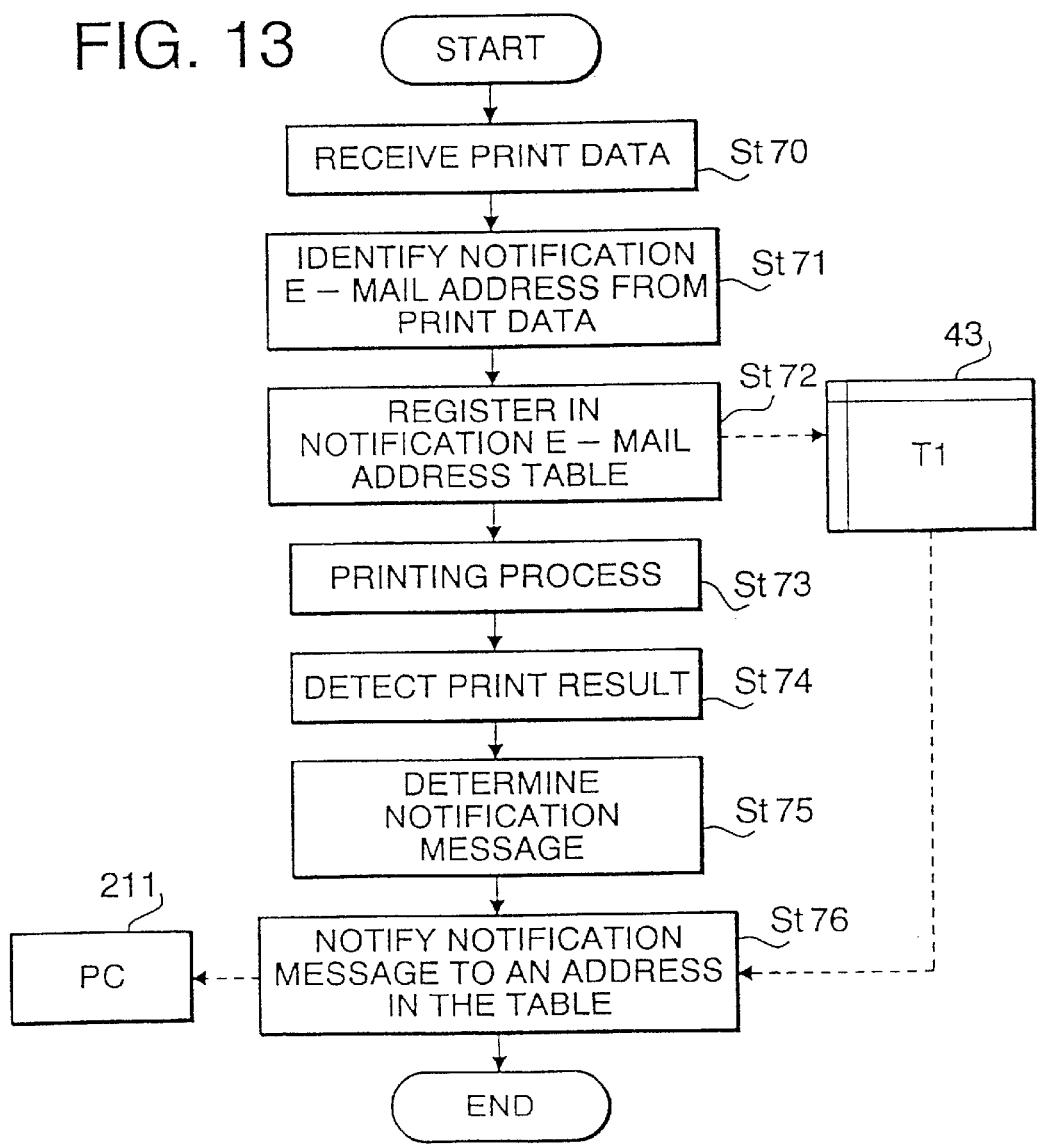
FIG. 13 is a flowchart illustrating procedures of notifying a print result to a notification e-mail address in the third embodiment.

FIG. 13 is a flowchart illustrating a process of notifying the result of a printing process to a notification e-mail address. When receiving print data whose printing is requested by a requesting node (St 70), the printing machine identifies the notification e-mail address affixed to the received print data from the data (St 71).

In the case where the result of the printing process is notified to the requesting node having requested the printing process, the sender address affixed to the print data can be used as the notification e-mail address so that it is unnecessary to particularly add the notification e-mail address. When the requesting node differs from the notification destination node for the result of the printing process, the e-mail address of the notification destination node is set as the notification e-mail address to the print data at the requesting node.

The CPU 41 registers the notification e-mail address, identified from the print data, in a return address table provided in the RAM 43 (St 72). The CPU 41 instructs the printer section 44 to carry out a printing process. Consequently, printing of the received print data is performed (St 73). When the printing process is executed, the result of the printing process is detected in the printer section 44 (St 74). A notification message according to the detected process result is determined (St 75), and the notification e-mail address previously registered in the return address table T1 is acquired. The notification message is notified to this notification e-mail address by e-mail.

Figure 14:
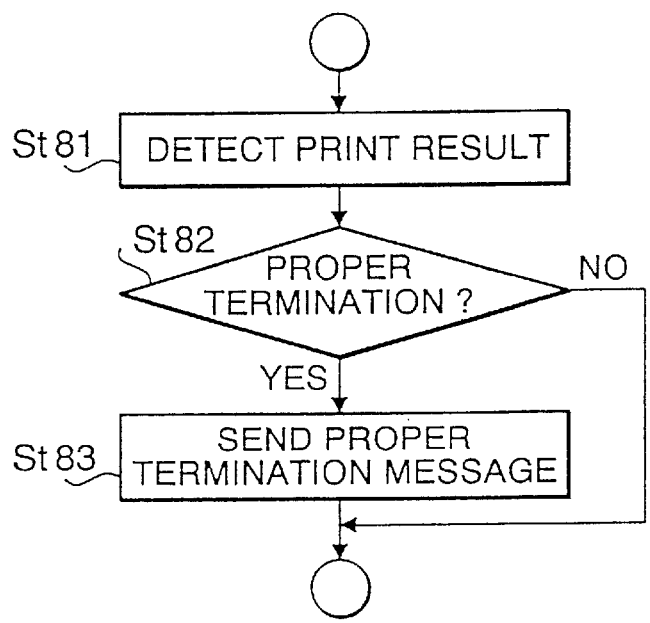
FIG. 14 is a flowchart for notifying a normal print result in the third embodiment.

FIG. 14 illustrates a process flow when the result of a printing process detected in the step 74 is proper termination. First, the result of the printing process is detected (St 81) and it is checked if the printing process has been terminated properly (St 82). When proper termination is confirmed, a message indicating proper termination is notified by e-mail to the notification e-mail address registered in the return address table T1 (St 83). If it is determined in the process in step 82 that the termination has not been done properly, a message indicating proper termination is not sent.

Figure 15:
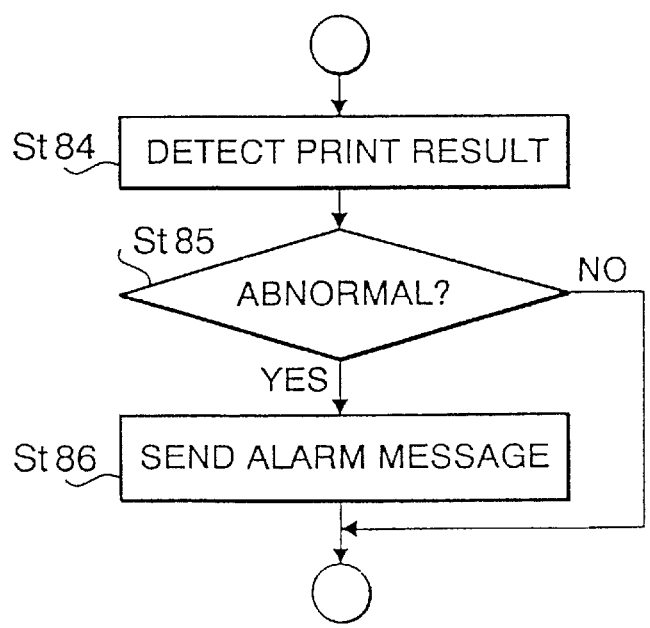
FIG. 15 is a flowchart for notifying an abnormal print result in the third embodiment.

FIG. 15 illustrates a process flow when the result of a printing process detected in the step 74 is abnormal termination. The result of the printing process is detected (St 84) and it is checked if the printing process has been terminated abnormally (St 85). When abnormal termination of the printing process is confirmed, a message indicating abnormality is notified to the notification e-mail address registered in the return address table T1 (St 86). If it is not abnormal, an alarm message is not sent.

According to the third embodiment, as described above, the e-mail address to which a process result is to be notified can be find out directly from the received print data and the result of the printing process can be notified to the requesting node which has requested the printing process. Therefore, the requester who has requested the printing process need not go over to the place of the printing machine to check the situation, and can obtain the result of the printing process on the site.

The person who requests a printing process can easily executes the printing process based on the above by designating the e-mail address of the notification destination and pressing the set button.

Once the e-mail address of the notification destination is set, a dialog box is not displayed next time a printing process is requested and the notification e-mail address need not be set again though it may be changed as needed.

Fourth Embodiment

The fourth embodiment of this invention will now be described.

The fourth embodiment is a system in which a printing machine which has received a printing request via a network notifies the result of the printing process by e-mail, and its basic structure is the same as that of the third embodiment. The printing machine is located on the network shown in FIG. 24 and receives print data via the network.

FIG. 16 is a flow illustrating a process of notifying individual print results of plural pieces of print data received from a plurality of printing requesters to respective notification e-mail addresses respectively affixed to the plural pieces of print data.

When plural pieces of print data are received at the same time from a plurality of requesting nodes (St 90), all print data are stored in a storage secured in the RAM 43 (St 91). The individual notification e-mail addresses are identified from the respective print data stored in the storage (St 92), and those identified notification e-mail addresses registered and stored in the return address table T1 in association with the respective print data (St 93). Printing process for the respective print data are performed (St 94), and it is detected if the result of each printing process has been terminated properly or abnormally (St 95). Individual notification messages are determined based on the results (St 96) and they are notified to the respective notification e-mail addresses corresponding to the print data, acquired by referring to the table T1 (St 97).

FIG. 17 shows the correlation table T1 of the print data and the notification e-mail addresses registered in the step 93, and the reception numbers are determined by the order print data has been received. The notification e-mail addresses are notification e-mail addresses affixed to the print data, and are associated with the reception numbers. In the illustrated example, the notification e-mail address for the print data with the reception number 1 is 123.456.789.00, and the result of the printing process on the print data is notified to this address.

According to the fourth embodiment, as described above, since e-mail addresses to which the results of individual printing processes are to be notified are affixed to all of plural pieces of print data received from a plurality of printing requesters, the printing requesters can individually obtain the process results.

Fifth Embodiment

The fifth embodiment of this invention will now be described.

The fifth embodiment is a system in which a printing machine which has received a printing request via a network notifies the result of the printing process by e-mail, and its basic structure is the same as that of the third embodiment. It is assumed that the printing machine is located on the network shown in FIG. 24 and receives print data via the network.

FIG. 18 is a flow illustrating a process of notifying a result to a notification e-mail address when the result of a printing process matches with notifiable result information specified by print data.

At the requesting node 211, a notification e-mail address and the type of a process to be notified (notifiable result information) are affixed to print data which is to be requested to the printing machine.

The printing machine receives the print data via the network from the requesting node 211 (St 101). The notification e-mail address and the notifiable result information are identified from the received print data (St 102). The notifiable result information identified from the print data is registered in the return address table T1 in association with the notification e-mail address in that table T1 (St 103).

FIG. 19 shows the table T1 in which the notification e-mail address, registered in step 103, and the types of the notifiable result information, registered in step 103, are associated with one another. The numbers set in this table T1 are numerals uniquely given print data by print data (in one-to-one association). Further, the notification e-mail address and the types of the notifiable result information, identified in step 102, are described in association with one another. It is possible to specify plural pieces of notifiable result information with respect to a single notification e-mail address. In the illustrated example, the notification e-mail address of print data indicated by the number 1 is 123.456.789.00, indicating that only when the printing result is any of three types, "paper jam," "communication error" and "no paper," a message representing the result is notified to the mentioned e-mail address.

After the notification e-mail address and the notifiable result information are set in the table T1, a printing process for printing the print data is performed (St 104). When the printing process is executed, the result of this printing process is detected (St 105). Then, it is checked if notifiable result information which matches with the detected process result is registered in the notifiable result information corresponding to the associated number in the table T1 (St 106). When it is checked that the notifiable result information matching with the detected process result is registered in the table T1, a notification message corresponding to the process result is determined from previously registered notification messages (St 108), and the determined notification message is notified by e-mail to the e-mail address in the table T1 (St 109).

When the notifiable result information matching with the detected process result is not registered in the table T1 in step 107, notification by e-mail is not made.

According to this fifth embodiment, the printing requesting side can dynamically designate the notification e-mail address and the type of notifiable result information, so that only when a specific printing result specified in print data occurs, a message can be received at the requesting node.

Sixth Embodiment

The sixth embodiment of this invention will be described next.

The sixth embodiment is a system in which a printing machine which has received a printing request via a network notifies the result of the printing process by e-mail, and its basic structure is the same as that of the third embodiment. The printing machine is located on the network shown in FIG. 24 and receives print data via the network.

Figure 20:
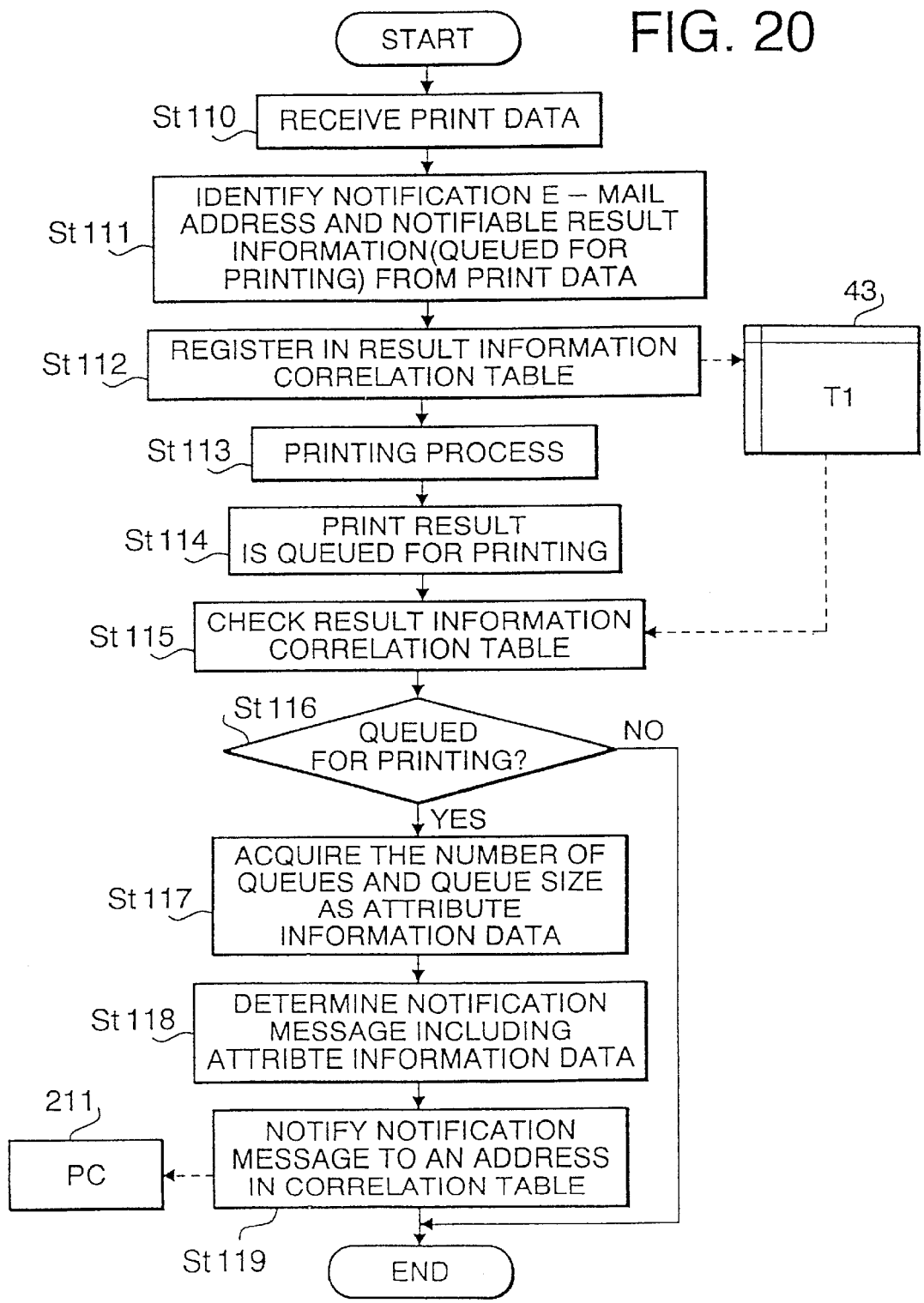
FIG. 20 is a flowchart illustrating procedures of notifying a result in a print queue mode according to the sixth embodiment.

FIG. 20 is a flow illustrating a process of notifying a result to a notification e-mail address when the result of a printing process is "queued for printing" and notifiable result information specified by print data includes "queued for printing."

The requesting node 211 sets "queued for printing" as one of notifiable result information in print data which is requested to the printing machine.

The printing machine receives the print data in which "queued for printing" is set in the notifiable result information from the requesting node 211 (St 110). A notification e-mail address added to the received print data and the notifiable result information including "queued for printing" are identified from the print data (St 111). The notification e-mail address identified from the print data is registered in the return address table T1, and the notifiable result information including "queued for printing" is registered in association with this notification e-mail address (St 112).

The printing machine performs a printing process for printing the print data received in step 110 (St 113). If another print request is in at this time, the currently made print request is "queued for printing." So, this printing machine detects if the "queued for printing" state has occurred (St 114). If the "queued for printing" state is detected when the printing process is instructed to the printer section, the CPU checks if "queued for printing" is registered in the notifiable result information registered in the table T1 (St 115). When it is confirmed from the checking that "queued for printing" is registered (St 116), the number of queues and the queue size which become attribute information are acquired (St 117). A notification message including the number of queues and the queue size in the attribute information is determined (St 118), and this notification message is notified to the e-mail address corresponding to the result information in the table T1.

When "queued for printing" is not registered in the process in step 116, the process result is detected again when the process is proceeded to the next printing process from the queue and the same result notification as done in the above-described fifth embodiment is carried out.

According to this sixth embodiment, even when the print state is not properly terminated because of "queued for printing," its status and attribute information can be obtained. Therefore, in addition to the reason why print data is not output, how long it takes to execute and terminate the process can be roughly estimated. When it takes time to go over to the printing machine to check it over and over again or printing out takes a long time, therefore, another work can be put in between. Note that a queue time may be computed based on the number of queues and the queue size.

Seventh Embodiment

The seventh embodiment of this invention will now be described.

The seventh embodiment is a system in which a printing machine which has received a printing request via a network notifies the result of the printing process by e-mail, and its basic structure is the same as that of the third embodiment. It is assumed that the printing machine is located on the network shown in FIG. 24 and receives print data via the network. A manager node which becomes the notification destination for a print result is located on the network.

Figure 21:
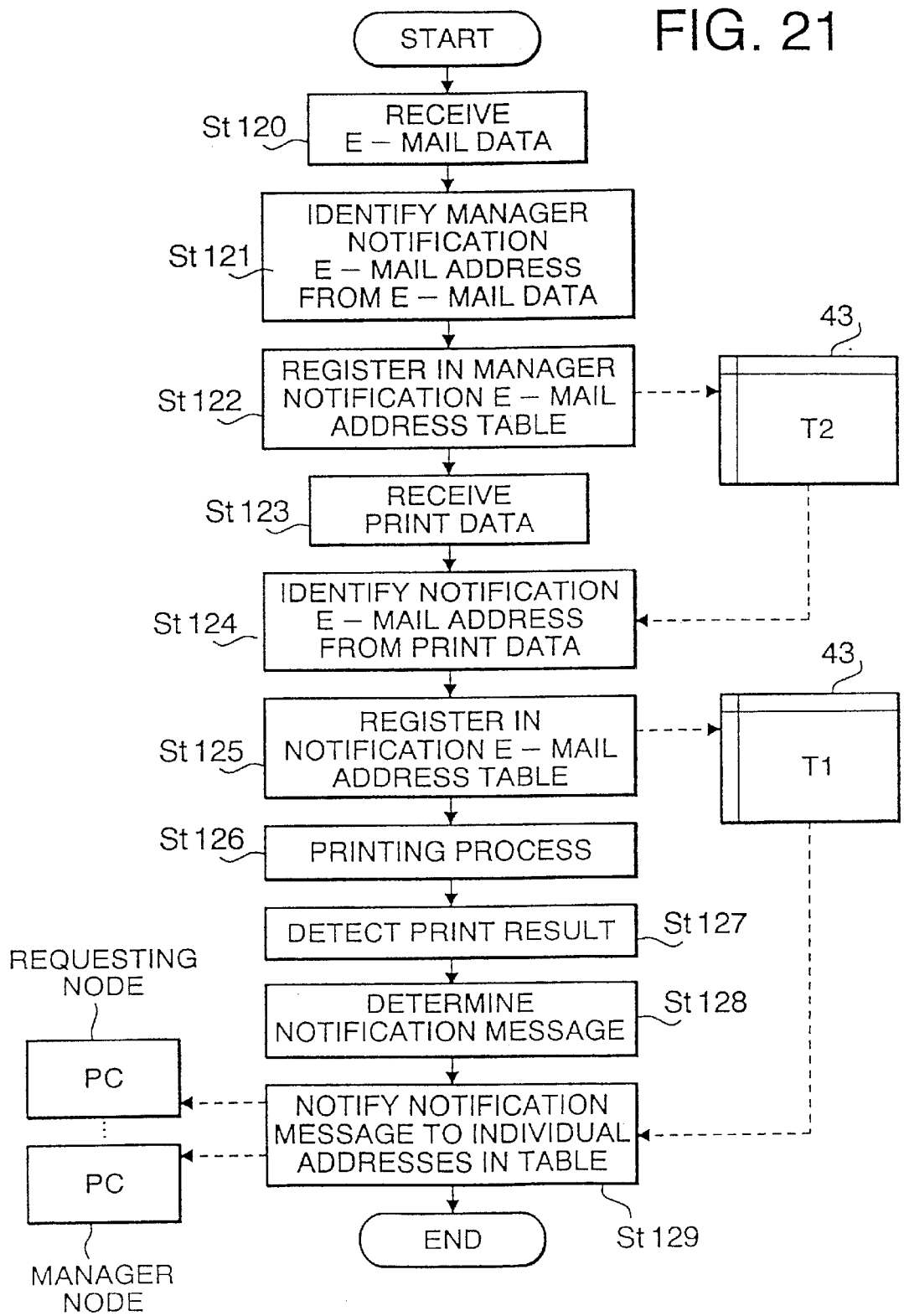
FIG. 21 is a flowchart showing procedures of notifying a print result to a manager notification e-mail address according to the seventh embodiment.

FIG. 21 is a flow showing a process of notifying a print result also to a manager notification e-mail address previously registered by e-mail.

The manager node, requesting node or another node previously notifies a manager notification e-mail address which is the e-mail address of the manager node to the printing machine.

When the printing machine receives the e-mail for notifying the manager notification e-mail address (St 120) and identifies the manager notification e-mail address from the e-mail (St 121), it registers the identified manager notification e-mail address in a manager notification address table T2. The manager notification address table T2 is secured in the RAM in the printing machine.

When a printing request is made to a specific printing machine, for example, the print result should be reported to the manager in some case. In such a case, prior to making the printing request to the printing machine, the requesting node notifies the manager notification e-mail address of the manager node.

When receiving the print data (St 123), the printing machine identifies the notification e-mail address affixed to the print data (St 124), and registers the identified notification e-mail address in the return address table T1 (St 125). A printing process for printing the received print data is performed (St 126) and its process result is detected (St 127). A notification message based on the detected process result is determined (St 128), and the determined notification message is notified to the manager notification e-mail address registered in the table T2 and the notification e-mail address registered in the table T1 (St 129).

According to this seventh embodiment, the result of a printing process can be notified by e-mail to the manager node as well as the requesting node.

Eighth Embodiment

The eighth embodiment of this invention will be described next.

The eighth embodiment is a system in which a printing machine which has received a printing request via a network notifies the result of the printing process by e-mail, and its basic structure is the same as that of the third embodiment. It is assumed that the printing machine is located on the network shown in FIG. 24 and receives print data via the network. A plurality of manager nodes which become the notification destinations for print results are located on the network.

According to the eighth embodiment, actual print results match with the types of notifiable result information previously registered by e-mail in association with manager notification e-mail addresses and the types of notifiable result information designated by the print data in association with notification e-mail addresses, the results are notified to the respective e-mail addresses.

Figure 22:
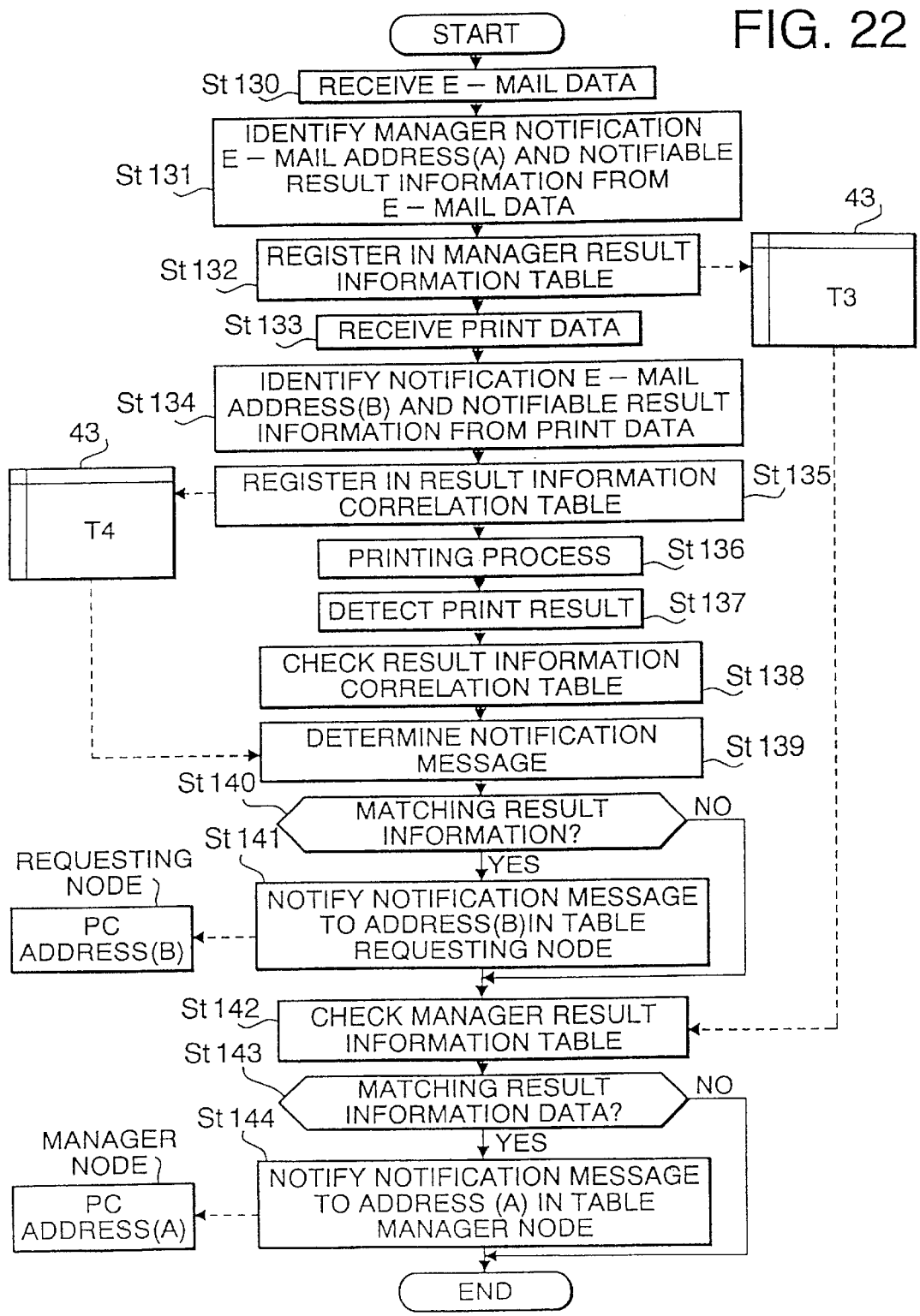
FIG. 22 is a flowchart illustrating procedures of notifying results when print results match with notifiable result information for managers according to the eighth embodiment.

FIG. 22 is a flow illustrating a process of notifying results to manager notification e-mail addresses and ]notification e-mail addresses when the types of notifiable result information match with actual print results.

A manager node sends an e-mail including the e-mail address of the manager node (manager notification e-mail address) and notifiable result information to the printing machine.

The printing machine receives the e-mail (St 130) and identifies a manager notification e-mail address A and the type of notifiable result information from the received e-mail (St 131). The manager notification e-mail address A and the type of the notifiable result information are acquired from the e-mail and are both are registered in a manager result information table T3 in association with each other (St 132).

FIG. 23 shows the manager result information table T3. In the manager result information table T3, the manager notification e-mail address and the type of the notifiable result information (notification message type), registered in step 132, are described in association with each other. The manager result information table T3 is secured in the RAM 43 of the printing machine. Plural pieces of notifiable result information can be designated with respect to a single manager notification e-mail address. In the illustrated example, the manager notification e-mail address indicated by the number 1 is 123.456.789.00, indicating that only when the printing result is any of three types, "paper jam," "communication error" and "no paper," a message representing the result is notified to the mentioned e-mail address.

When receiving the print data (St 133), the printing machine identifies a notification e-mail address B affixed to the print data and the type of notifiable result information from this print data (St 134). The notifiable result information which corresponds to the notification e-mail address B is registered in a result information correlation table T4 (St 135). The result information correlation table T4, which has the same data structure as the one in FIG. 19, is secured in the RAM 43 of the printing machine.

The printing machine performs the printing process on the received print data (St 136) and detects the process result (St 137). It is checked if the result information which matches with the detected process result is registered in the result information correlation table T4 (St 138), and when the result information matching with the process result is registered, that result information is determined as a notification message (St 139). When the result information matching with the process result is registered in the process in step 139 (St 140), the notification message is notified to the e-mail address B of the requesting node registered in the result information correlation table T4 (St 141). When there is no matching result information in the process in step 138, nothing is done.

Further, it is checked if the result information which matches with the process result is registered in the manager result information table T3 (St 142), and when the registration of the result information matching with the process result is confirmed (St 143), the notification message is notified to the manager notification e-mail address A registered in the manager result information table T3 (St 144). When there is no matching result information in the process in step 142, nothing is done.

According to the eighth embodiment, as discussed above, a plurality of manager notification e-mail addresses can be registered by e-mail in association with notifiable result information, so that the result of a printing process can be notified to a plurality of manager nodes as well as the requesting node.

The printing result notifying methods described in the sections of the third to eighth embodiments are adapted to the communication result notifying method by facsimile transmission which has been discussed in the section of the first embodiment or the second embodiment.

In the first embodiment or the second embodiment, a proper termination message and abnormal termination message as illustrated in the section of the third embodiment are notified by e-mail to the requesting node in accordance with the detection result of the facsimile transmission or reception process.

Further, in the first embodiment or the second embodiment, when requests for the transmission of, or the reception of, plural pieces of facsimile data are received, notification e-mail addresses are obtained from the respective facsimile data and registered in a table as shown in FIG. 17, and the individual transmission processes or reception processes are notified to the e-mail addresses registered in the table, as illustrated in the section of the fourth embodiment.

Furthermore, in the first embodiment or the second embodiment, a requesting node adds notifiable result information to be notified to facsimile data and then makes a request, and a NETFAX prepares a table as shown in FIG. 19, as illustrated in the sections of the fifth and eighth embodiments. When the result information registered in the table matches with the result of the transmission or reception process, the requesting node or the like is notified.

Furthermore, in the first embodiment or the second embodiment, the transmission queue state of facsimile data is detected, and when there is a transmission queue, the queue state is notified by e-mail to the requesting node or manager node as illustrated in the section of the sixth embodiment.

Furthermore, in the first embodiment or the second embodiment, tables as shown in FIGS. 19 and 23 are prepared as illustrated in the sections of the seventh and eighth embodiments, and the process illustrated in FIG. 22 is executed with a printing process and print data replaced with a facsimile transmission process and facsimile data.

This invention is not limited to the above-described embodiments, but may be modified in various forms without departing from the spirit or scope of the invention.

Industrial Applicability

The facsimile machine and communication result notifying method according to this invention are suitable for use in a communication system which requests a facsimile machine or a printing machine on a network to execute the transmission of facsimile data or the printing of print data.

What is claimed is:

1. A facsimile apparatus for transmitting facsimile data converted from e-mail data to a facsimile destination via a public telecommunication network, comprising:

a receiver that receives the e-mail data from a requesting node;

a memory that stores a password and a domain name of a requesting node;

an acquiring section that acquires a destination address including at least a telephone number, a password and a domain name, from the requesting node;

a converter that converts the e-mail data into facsimile data;

a comparator that compares the password and the domain name acquired by said acquiring section, with the password and the domain name stored in said memory respectively; and a facsimile transmitter that, when a result of the comparison indicates that the password and the domain name acquired are the same as the password and the domain name stored in said memory, transmits the converted facsimile data to the facsimile destination designated by the telephone number, and that, when a result of the comparison indicates that the password and the domain name acquired are not the same as the password and the domain name stored in said memory, does not transmit the facsimile data to the facsimile destination.

2. The facsimile apparatus according claim 1, further comprising a transmitter that transmits error mail to the requesting node when a result of the comparison indicates that the password and the domain name acquired by said acquiring section are not the same as the password and the domain name stored in said memory.

3. The facsimile apparatus according to claim 1, wherein the requesting node is a personal computer.

4. The facsimile apparatus according to claim 1, wherein, when facsimile data is transmitted to the facsimile destination, a log including information relating to a sender of the facsimile data and the telephone number is transmitted to a manager node.

5. A facsimile apparatus for transmitting facsimile data converted from e-mail data to a facsimile destination via a public telecommunication network, comprising:

a LAN interface section that receives the e-mail data from a requesting node;

a memory that stores a password;

an acquiring section that acquires a destination address including at least a telephone number and a password, from the requesting node;

a converter that converts the e-mail data into facsimile data;

a comparator that compares the acquired password with the password stored in said memory; and a facsimile section that, when the acquired password is the same as the password stored in said memory, transmits the converted facsimile data to the facsimile destination designated by the telephone number.

6. The facsimile apparatus according claim 5, wherein said LAN interface section, said memory, said converter, and said facsimile section are integrated in the facsimile apparatus.

7. A facsimile apparatus for transmitting facsimile data converted from e-mail data to a facsimile destination via a public telecommunication network, comprising:

a receiver that receives the e-mail data from a requesting node;

a password table that stores passwords;

an acquiring section that acquires a password from a destination address attached to the e-mail data; and a transmitter that transmits facsimile data converted from the e-mail data, to the facsimile destination via the public telecommunication network when the acquired password is stored in said password table, wherein said transmitter does not transmit the facsimile data to the facsimile destination when the acquired password is not stored in said password table.

8. The facsimile apparatus according to claim 7, further comprising a domain name table that stores a plurality of domain names;

wherein the acquiring section acquires a domain name from the destination address and said transmitter transmits facsimile data, converted from the e-mail data, to the facsimile destination via the public telecommunication network when a domain name acquired from the destination address attached to the e-mail data is stored in said domain name table.

9. A method for transmitting facsimile data converted from e-mail data to a facsimile destination, using a facsimile apparatus via a public telecommunication network, the facsimile apparatus having a memory that stores a password and a domain name of a requesting node, the method comprising:

receiving the e-mail data from a requesting node;

acquiring a destination address including at least a telephone number, a password and a domain name, from the requesting node;

converting the e-mail data into facsimile data;

comparing the password and the domain name acquired, with the password and the domain name in the memory, respectively; and transmitting, when a result of the comparing indicates that the password and the domain name acquired are the same as the password and the domain name in the memory, the converted facsimile data to the facsimile destination designated by the telephone numbers, and, when a result of the comparing indicates that the password and the domain name acquired are not the same as the password and the domain name in the memory, not transmitting the facsimile data to the facsimile destination.

10. A method for transmitting facsimile data converted from e-mail data to a facsimile destination, using a facsimile apparatus via a public telecommunication network, the facsimile apparatus having a password table that stores at least a password, the method comprising:

receiving the e-mail data from a requesting node;

acquiring a password from a destination address attached to the e-mail data; and transmitting facsimile data converted from the e-mail data, to the facsimile destination via the public telecommunication network when the acquired password is stored in the password table, and when the acquired password is not stored in said password table, not transmitting the facsimile data to the facsimile destination.

* * * * *